US011265531B2

(12) United States Patent
Saunders

(10) Patent No.: US 11,265,531 B2
(45) Date of Patent: *Mar. 1, 2022

(54) SYSTEMS AND METHODS OF CREATING A THREE-DIMENSIONAL VIRTUAL IMAGE

(71) Applicant: HashD, Inc., Aurora, CO (US)

(72) Inventor: Marc Saunders, Aurora, CO (US)

(73) Assignee: HashD, Inc., Aurora, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,262

(22) Filed: Nov. 30, 2020

(65) Prior Publication Data

US 2021/0084285 A1  Mar. 18, 2021

Related U.S. Application Data

(63) Continuation of application No. 15/268,526, filed on Sep. 16, 2016, now Pat. No. 10,855,971.

(60) Provisional application No. 62/219,583, filed on Sep. 16, 2015.

(51) Int. Cl.
| | |
|---|---|
| *H04N 13/243* | (2018.01) |
| *H04N 13/246* | (2018.01) |
| *H04N 13/117* | (2018.01) |
| *H04N 13/207* | (2018.01) |
| *H04N 13/15* | (2018.01) |

(Continued)

(52) U.S. Cl.
CPC ......... *H04N 13/243* (2018.05); *H04N 13/117* (2018.05); *H04N 13/15* (2018.05); *H04N 13/207* (2018.05); *H04N 13/246* (2018.05); *G06F 3/017* (2013.01); *H04N 2013/0077* (2013.01)

(58) Field of Classification Search
CPC .............................. H04N 13/207; H04N 13/15
USPC ............................................................ 348/48
See application file for complete search history.

(56) References Cited

U.S. PATENT DOCUMENTS

| | | | |
|---|---|---|---|
| 5,973,732 | A | 10/1999 | Guthrie |
| 6,130,707 | A | 10/2000 | Koller et al. |
| 8,976,172 | B2 | 3/2015 | Jones |

(Continued)

FOREIGN PATENT DOCUMENTS

WO   WO 2015/173173   11/2015

OTHER PUBLICATIONS

Office Action for U.S. Appl. No. 15/268,526, dated May 3, 2018.

(Continued)

*Primary Examiner* — Amir Shahnami
(74) *Attorney, Agent, or Firm* — Jason H. Vick; Sheridan Ross, PC

(57) ABSTRACT

Aspects are generally directed toward creating a three-dimensional virtual model by a user identifying a three-dimensional object. Next, the system captures a plurality of two-dimensional images of the object in succession, the plurality of images being captured from different orientations, and recording the plurality of images on a storage medium. Then the system determines the relative change in position of the plurality of images by comparing two subsequent images, wherein the relative change is determined by a difference in color intensity values between the pixels of one image and another image, generates a plurality of arrays from the difference determined and generates a computer image from the plurality of arrays, wherein the computer image represents the three-dimensional object.

20 Claims, 12 Drawing Sheets

(51) Int. Cl.
*G06F 3/01* (2006.01)
*H04N 13/00* (2018.01)

(56) References Cited

U.S. PATENT DOCUMENTS

| | | |
|---|---|---|
| 10,855,971 B2 | 12/2020 | Saunders |
| 2008/0106612 A1* | 5/2008 | Fujino .................... H04N 9/735 348/222.1 |
| 2014/0293091 A1 | 10/2014 | Rhoads et al. |
| 2015/0078669 A1 | 3/2015 | Ukil et al. |
| 2016/0232711 A1 | 8/2016 | Jones et al. |
| 2017/0085733 A1 | 3/2017 | Ilic et al. |
| 2017/0184449 A1 | 6/2017 | Ozawa |

OTHER PUBLICATIONS

Office Action for U.S. Appl. No. 15/268,526, dated Nov. 29, 2018.
Office Action for U.S. Appl. No. 15/268,526, dated Aug. 20, 2019.
Office Action for U.S. Appl. No. 15/268,526, dated Mar. 19, 2020.
Notice of Allowance for U.S. Appl. No. 15/268,526, dated Aug. 11, 2020.

* cited by examiner

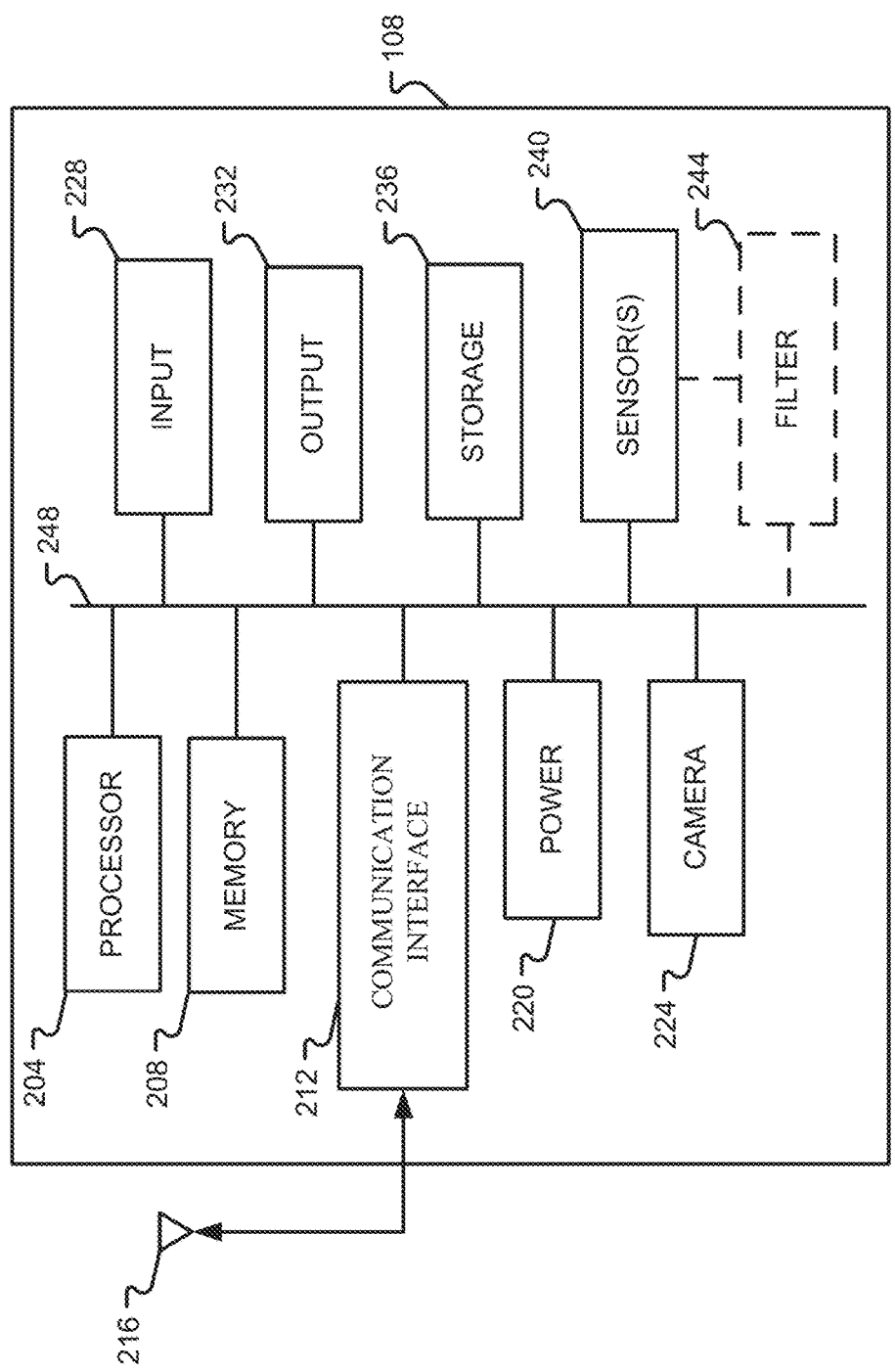

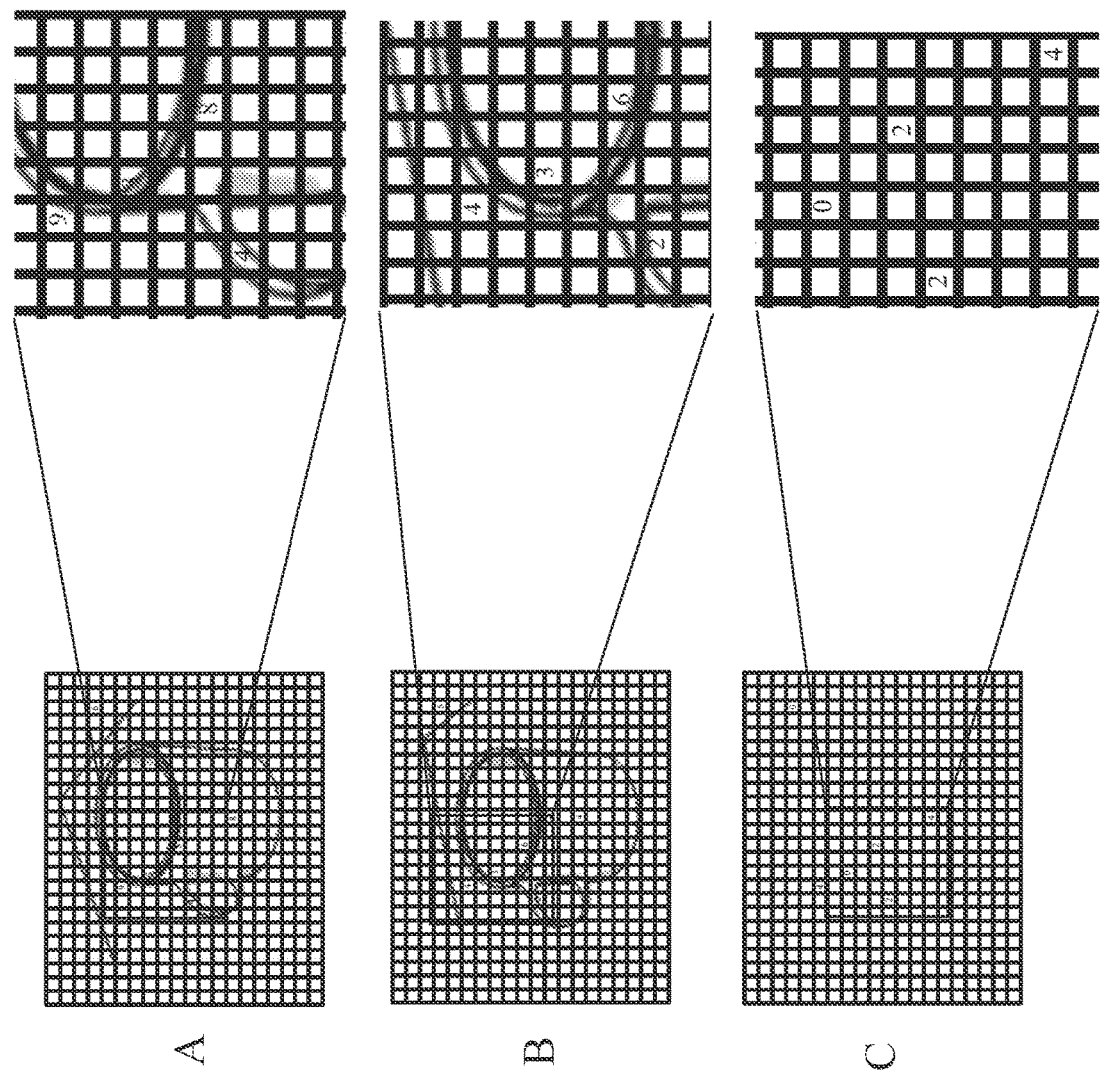

SYSTEMS AND METHODS OF CREATING A THREE-DIMENSIONAL VIRTUAL IMAGE

CROSS-REFERENCE TO RELATED APPLICATIONS

This application is a Continuation of U.S. patent application Ser. No. 15/268,526, filed Sep. 16, 2016, now U.S. Pat. No. 10,855,971, which claims the benefit of U.S. Provisional Patent Application Ser. No. 62/219,583, filed Sep. 16, 2015 the entire contents of which are hereby incorporated herein by reference for all that they teach and for all purposes.

FIELD OF THE INVENTION

The systems and methods relate to creating a three-dimensional virtual image, model, and using a single image capture device, such as a digital camera.

BACKGROUND

Often times in production and design, it is useful to generate small, scaled models of a subject product or building prior to final product fabrication or final build. These models provide a concrete, visual object that pulls all conceptual elements into one object, and therefore make it more reasonable to consider the product or building as a whole. By considering the model as a whole, criticisms can be discovered and rectified before an object, such as the product or building itself and/or a component thereof, is produced, and can therefore increase efficiency and reduce costs during the production process.

Though tremendously invaluable, generating a useful model is a very time-consuming process, and one that requires exceptional skill. Because such skill is required, producing a model typically necessitates the employment of a well-trained artist, which can be very expensive. Because of the highly customized nature of models, each additional model will incur a similar expense, even if models are nearly identical. Further, although they are cheaper to produce than full-scale prototypes, models often require highly specialized building materials. Because of these requirements, models can still be quite expensive to create.

One alternative to traditional modeling is to create a virtual model. A virtual model is a computational representation of a model in which a digital coordinate system (such as a Cartesian system) represents a three-dimensional (3D) space of the real world, and coordinates for many points that are displayed within this system such that an object appears on a monitor, screen, display, or other output device similar to its real world counterpart. The number of points representing the object in question affects its fidelity: more points create a more accurate representation, although greater numbers of points require greater computational power.

Virtual models are a valuable resource in production and design, and have supplemented or even replaced more conventional models and architectural renderings outright in some applications. Virtual models offer designers a way to generate models of objects that can be easily modified; size, shape, color, and many other physical aspects can be modified in a relatively easy manner. Each change can be rendered without the use of any new physical material, and do not require the production of a new physical product, which would be very expensive and time consuming. Virtual models make it possible to visualize the product in question in its intended setting, such as a rendering of a building that does not yet exist in an existing lot. Further, undesirable changes can be quickly and easily undone, and multiple instances of virtual models can be viewed simultaneously for comparison. Virtual, interactive renderings can instead be generated digitally on a computer monitor or other display, and/or sent to a three-dimensional printer for cheap, fast prototyping, making virtual models a tremendously efficient quality control step in the production process, or even a complete alternative to traditional prototyping.

One very large advantage of digital/virtual models is the ability to instantly create exact replicas. Duplicated models can be easily modified for subtle changes and compared for aesthetic or any other preferences. In traditional modeling, each model requires substantial time and resources, and exact replicas are not possible because of subtle variations in the model-making process. In most cases, any substantial changes to a model that are desired must be considered before construction of a new instance of the model in order to be incorporated. This limitation makes it more difficult to affect further modifications that are conceived of during model making, which can therefore be a detriment to the creative process. Changes that can be made to an existing model after construction necessarily replace the original form, making side-by-side comparison impossible. Both of these limitations are easily navigated by the use of virtual models. Changes are easily incorporated at any stage of model development, and multiple, exact replicas can be instantaneously generated and quickly modified for side-by-side comparison or any other purpose.

While virtual representations are an advantageous tool for producers of creative content, the generation of such virtual content is highly specialized. The ability to generate such a useful model is highly dependent upon the skill of the modeler, and upon the modeler's familiarity with software that facilitates such modeling. Such software is highly technical and can take years to learn. Because of its highly specialized application, acquiring this skill is often unreasonable for inventors from varied backgrounds. Furthermore, such software is often prohibitively expensive. In short, the software required to generate virtual content itself, along with the ability to use it, are themselves often a barrier to efficiently generating useful models.

One particularly useful strategy in navigating technical challenges is to generate three-dimensional models based on existing objects in the real, physical world and modify them. Such models provide a detailed substrate for future modification, thus reducing the overall design burden. While useful, generating three-dimensional content based on real world objects is currently also challenging and time consuming for many modelers. This makes it impractical for many designers, despite regularly needing to do so for the purposes of either generating starting forms upon which a new model will be based, or as secondary objects that will interact with the model in some way. Modelers that do attempt to model real world objects are confined to the immobile nature of modeling software. Rather than modeling an object as they can see it in the real world, a modeler must find adequate images of the object they wish to model from many views. Typically, this requires that a blueprint of the object, detailing many views of the object in question, is available to them. Such blueprints are themselves highly technical, time consuming, and often expensive to generate.

One solution to these challenges is automated, imaging-based software capable of analyzing multiple two-dimensional images of the same object and generating three-dimensional coordinates of the object from these images. This would eliminate the technical challenges associated with generating such a model, the cost barrier of expensive modeling software, and the requirement of existing images or blueprints. Once the difficult part of generating a three-dimensional shape has been carried out, a designer can then modify the shape quickly and with relatively little training. Several three-dimensional scanned objects (or parts of objects) could then be assembled into a final model with relative ease.

One example of prior art has attempted to solve this problem using lasers and rotating platters. In this system, an object is placed on the rotating platter, and one or more lasers are aimed at the object. The distance from the laser to the object changes over time as the object rotates and the laser moves across the surface of the object, and these distances are detected and stored as a series of range vectors. These range vectors can be used to reconstruct the surface of the object in virtual space, thus producing a virtual model of the object in question. This prior art requires hardware that is expensive and inaccessible to most designers. Furthermore, such a device is immobile, and limited to objects small enough to fit on the rotating platter Another example of an existing product is a piece of hardware consisting of a special camera that attaches to a tablet. The hardware is used to project an infrared laser beam in a specific pattern. The camera mounted on the tablet can then be used to "scan" back and forth across an object by way of user movement. An infrared sensor on the device collects and records distortions in a pattern at VGA resolution while scanning. The data collected from this process can then be used to create a depth map of the material being scanned. The tablet's camera is also invoked to record color information. The data can then be exported to software, which reassembles the images into a three-dimensional model.

The prior art requires special hardware and a secondary export to software, which requires additional resources such as a user's time and an expense of additional equipment, such as requiring a user to carry additional hardware. The additional hardware also requires its own battery and must be charged in addition to the tablet. Further, the extra hardware requirement limits the context in which the device is used. Specifically, its use is limited to tablets such as iPads, which requires a user to purchase one if they do not own one, in addition to the costs of specialized hardware. Any future use with anything other than a tablet would require new hardware to be developed in order to interface with existing hardware, such as a satellite, microscope, or mobile phone.

Another example of an existing product uses the camera in a mobile phone to acquire images where a user places an object on a reference surface and walks around the object, taking many static images of the object from many different angles, and revolving the object several times in the process. Although this product does not require special hardware, it is limited with regard to producing the type of models to be used in a production environment. The process is also highly dependent upon the skill of the user in finding appropriate angles and lighting conditions, and in taking enough images. Because the software involves simply image analysis, the software is incapable of distinguishing many objects from one another, and further requires the user to clean up the image by removing elements of the image that were inappropriately included in the three-dimensional model. This product is based on an existing ability to map virtual three-dimensional meshes onto points of light and dark, and is meant to be used in the context of specialized software in order to be useful, which is itself an example of the expensive modeling software mentioned previously.

Another example of an existing product can be used on a standard mobile phone to record images, but must be subsequently processed on far more powerful hardware. This requires a user to purchase very expensive accelerated graphics processors, or to pay a developer for access to their hardware as a service. These additional cost barriers are ostensibly the result of inefficient processing algorithms that require very powerful processors.

A process that does not require expensive hardware, software, or extensive training and experience would be far more desirable, and would substantially increase the accessibility of virtual model making. The increased accessibility and reduction on time and money demands could not only have a tremendous economic effect with the ability to generate prototypes of ideas, but should also help to identify problems and errors more quickly. It would provide designers with a much faster way of navigating the technical, difficult portion of model generation by taking advantage of existing technology to automatically generate a shape that is imaged with a camera, and without requiring the purchase of any additional hardware.

Virtual models of real objects simulated in three-dimensional space rendered in the manner described above have many possible applications beyond production and design. Such applications can range from routine and hobbyist to highly technical, specialized use if the ability to generate and use virtual models is more portable, requires less technical training to use, and more financially accessible to more people. Interior design applications, for example, could be tremendously expedited if one were able to portably record the interior of a room and have the recording translated into a virtual model. Alternatively, scientists studying in the field could record virtual models of specimens for future analysis without disturbing the specimen or its habitat. Applications such as this could not only save tremendously on costs, but would allow work to be carried out in a non-invasive manner.

SUMMARY

It is with respect to the above issues and other problems that the embodiments presented herein were contemplated. That is, in accordance with embodiments of the present disclosure, systems and methods are presented for scanning virtually any real-world object with a single image capture device, such as a digital camera. In accordance with embodiments of the present disclosure, a user, without using multiple cameras, takes one image of an object, rotates the camera at some angle and then takes another image of the object. By merging the two images together and then measuring a rotation, a depth of a scanned object can be determined. A distance as a value may be provided in accordance with embodiments of the present disclosure. For example, a distance from a mobile device with a camera to an object may be provided and later utilized to create and/or modify a virtual three-dimensional model of the object.

Embodiments of the present disclosure may be used in existing mobile technology like smartphones, or any digital camera with some type of rotational measurement device. A scanned object may be used for rapid prototyping and three-dimensional printing. Similar to a flat-bed two-dimensional scanner (e.g., a photocopier), embodiments of the present disclosure may scan any three-dimensional object and display a virtual three-dimensional object on a display of a smartphone and/or three-dimensionally print the scanned object. For example, virtual coordinates of an object may be sent straight to a 3D printer for physical object duplication. The applications of such a technology may be applied in many fields. For instance, if applied in the medical field, three-dimensional body scans may be obtained for surgical or other medical purposes. Such technology might also find tremendous utility in health applications. If, for example, a doctor could quickly generate a virtual model of some region on a patient in need of a medical procedure such as surgery, that doctor may familiarize herself with the region in question and get a sense of what must be done prior to surgery. This reduces physiological stress on the patient by shortening the duration of surgery and reduces the chances of accident by allowing the physician to know exactly what to expect, allowing her to become mentally prepared for the operation. Changes to a virtual model may also be verified by the patient prior to the surgery, further reducing risk of accident.

Similarly, the entertainment industry consisting of movies and games for example, may employ three-dimensional graphics on a regular basis, objects and characters may quickly be scanned and modeled. For example, video game developers or users may scan an object and create their own elements to incorporate into video games. In accordance with embodiments of the present disclosure, the security industry may benefit from conducting body scans of assailants without the assailant's knowledge because, unlike a laser, a camera may be utilized as a passive measuring device, meaning, the scanned object would have no knowledge that it is being scanned. Moreover, security cameras may also reconstruct virtual models of an object and, if retrofitted, could be made to include data outside the visual spectrum of light, such as from X-ray or ultrasound, for example.

In accordance with embodiments of the present disclosure, other applications such as but limited to satellite imaging may find great utility by employing systems, methods, and/or techniques described herein. For example, various sized regions (e.g., small, medium, large) of Earth may be surveyed by satellite utilizing the methods and systems described herein; accordingly, three-dimensional virtual models may be generated quickly and/or efficiently. Such virtual three-dimensional models may be very useful for climate modeling, as one example. Such satellite imaging cameras may be used to reconstruct virtual models of an object and, if retrofitted, could be made to include data outside the visual spectrum of light, such as from X-ray or ultrasound, for example.

Likewise, artists seeking to use a real, physical object in some capacity—such as for demolition in a film sequence—must currently either build a real, physical model of the item in question or generate a virtual one. The latter process requires extensive experience in virtual modeling and access to expensive modeling computer programs, as previously mentioned. The process of generating a virtual model is time consuming for the modeler and thus can be very expensive for the producer, all of which could be bypassed with a better imaging-based solution. Such a technology described herein may open up many possibilities for use with hobbyists who simply like to collect, model, and manipulate virtual counterparts of real world objects and further explore new areas of pastimes using such available technology. Such exploration has potential for generating new uses and new industries. For example, vendors could generate libraries of catalogued items for exchange, charging premiums on rare and high fidelity items. A technology that overcomes the challenges previously mentioned would therefore be tremendously invaluable to society.

In accordance with at least some embodiment of the present disclosure, a mobile device is provided, the mobile device including a display, a processor, and one or more memories including one or more instructions that when executed by the processor, cause the processor to obtain a plurality of two-dimensional images of an object in succession, the plurality of two-dimensional images being captured form different orientations, store said plurality of two-dimensional images into the one or more memories, determine a relative change in position of said plurality of two-dimensional images by comparing two subsequent images of the plurality of two-dimensional images, wherein the relative change is determined by a difference in color intensity values between pixels of one of the two subsequent images and the other image, generate a three-dimensional coordinate based on the relative change in position, generate a computer image including the three-dimensional coordinate, wherein said computer image represents the three-dimensional object, and output to the display, the computer image representing the three-dimensional object.

In accordance with at least some embodiments of the present disclosure, a method of generating a virtual three-dimension model of an object is provided, the method including obtaining a plurality of two-dimensional images of the object in succession, the plurality of two-dimensional images being captured form different orientations, storing said plurality of two-dimensional images into one or more memories, determining a relative change in position of said plurality of two-dimensional images by comparing two subsequent images of the plurality of two-dimensional images, wherein the relative change is determined by a difference in color intensity values between pixels of one of the two subsequent images and the other image, generating a three-dimensional coordinate based on the relative change in position, and generating a computer image including the three-dimensional coordinate, wherein said computer image represents the three-dimensional object.

Further yet, and in accordance with at least some embodiment of the present disclosure, a non-transitory computer readable medium having stored thereon instructions that cause a processor to execute a method is provided, the method comprising one or more instructions to obtain a plurality of two-dimensional images of an object in succession, the plurality of two-dimensional images being captured form different orientations, one or more instructions to store said plurality of two-dimensional images into the one or more memories, one or more instructions to determine a relative change in position of said plurality of two-dimensional images by comparing two subsequent images of the plurality of two-dimensional images, wherein the relative change is determined by a difference in color intensity values between pixels of one of the two subsequent images and the other image, one or more instructions to generate a three-dimensional coordinate based on the relative change in position, one or more instructions to generate a computer image including the three-dimensional coordinate, wherein said computer image represents the three-dimensional object, and one or more instructions to output to the display, the computer image representing the three-dimensional object.

Accordingly, it is these and other advantages that will be apparent from the disclosure.

BRIEF DESCRIPTION OF THE DRAWINGS

The present disclosure is described in conjunction with the appended figures:

FIG. 2 depicts additional details of a communication device in accordance with embodiments of the present disclosure;

FIGS. 3A-3B generally depict additional details with respect to a pixel mapping process in accordance with embodiments of the present disclosure;

DETAILED DESCRIPTION

Figure 1:
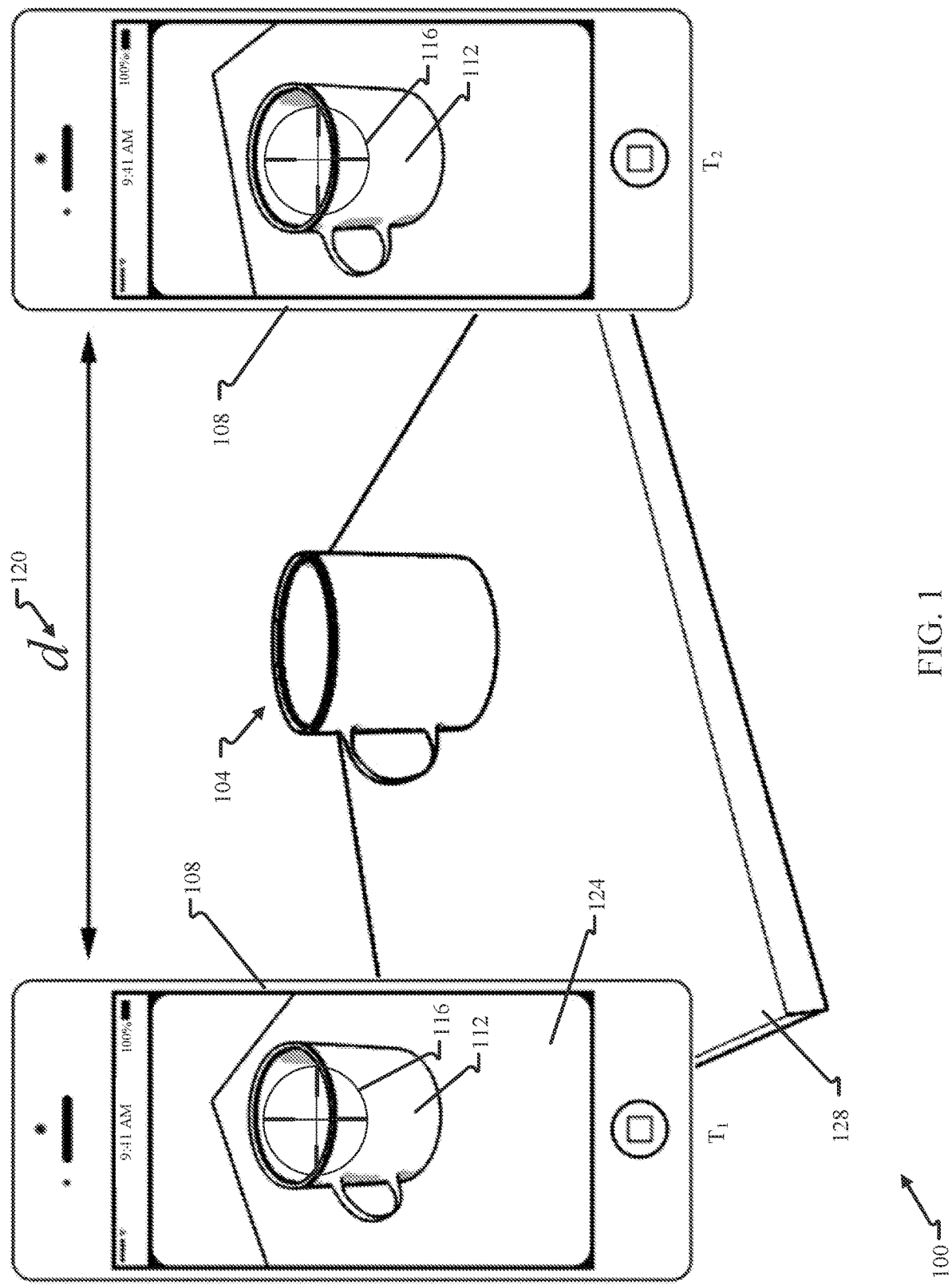
FIG. 1 depicts a first system for creating a three-dimensional virtual image in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims. To avoid unnecessarily obscuring the embodiments described herein, the following description omits well-known structures, components, and devices that may be shown in block diagram form or are otherwise summarized.

Similar to the way a human brain uses two images (one generated by each eye) to estimate depth, in accordance with embodiments of the present disclosure, at least one embodiment estimates distance to an object or objects of interest. For example, instead of two images separated in space, certain embodiments instead use two subsequent images separated by a small time delay and a measurable distance. For instance, a user may capture an image of an object or objects of interest and then rotate an image capture device by some angle and capture another image. The two images may then be merged together and the rotation of the image capture device between the two images may be measured. Accordingly, the distance to the object can be estimated.

In accordance with embodiments of the present disclosure, a distance to the object or objects of interest may be determined (e.g., measured). As depicted in at least FIG. 1, embodiments in accordance with the present disclosure utilize a mobile device, such as a smartphone 108, to obtain a plurality of images of an object, such as an object of interest 104. Of course, other objects, such as object 128, may be imaged as well. An estimated distance between an object in smaller and smaller regions of two images may be compared in an iterative manner and may result in a physical distance. As one example, both images may be iteratively subdivided in a same or similar way and an estimated distance moved between the object in the first image and the object in the second image may be determined for each subdivision. In this way, relative movement rates are established for arbitrarily small features in the images. Similar to the way the human brain processes images, the embodiments of the present disclosure are able to differentiate objects from one another at least in part by these relative movement differences. An overall average of estimated movement (the center of rotation), as well as a map of differences between smaller features of the images, is obtained; each of these may be utilized in a distance calculation using a known difference in an angle of rotation between first and second (subsequent) images.

At least one embodiment in accordance with the present disclosure includes an image capture device, a storage medium, a processing unit, and a means of monitoring a relative position of the image capturing device, such as a global positioning system ("GPS") or gyrometer. Embodiments of the present disclosure can therefore function on any hardware that includes these features, such as a smartphone. Accordingly, embodiments of the present disclosure include a means of relating these technologies in order to identify a central object from many different angles. Thus, a three-dimensional virtual model may be created by: (1) a user identifying a three-dimensional object; (2) capturing a plurality of two-dimensional images of said object in succession, said plurality of images being captured from different orientations; (3) recording said plurality of images on a storage medium; (4) determining the relative change in position of said plurality of images by comparing two subsequent images; wherein the relative change is determined by a difference in color intensity values between the pixels of one image and another image; (5) generating a plurality of arrays from the difference determined; and (6) generating a computer image from said plurality of arrays, wherein said computer image represents said three-dimensional object.

Embodiments of the present disclosure may therefore utilize existing recording hardware, positional sensor, processor, and storage medium, all of which may exist within the same unit. Certain embodiments involve a capture thread, which is how a user interacts with a camera with the 3D model-capturing software application. For instance, a user may download and install an application on a mobile device 108 or equivalent hardware. The user starts the application and uses hardware in the mobile device 108 to measure the object of interest 104. As depicted in FIG. 1, the object of interest 112 may be displayed on a display of the mobile device 108.

In accordance with embodiments of the present disclosure, an identity matrix is set up in which all measurements will be referenced and further, an empty "first in, first out" (FIFO) stack is created. Thus, a capture thread may include: (1) begin capturing images; (2) checking to see if the user actor has terminated the scan; (3) capture an image using an image capture device (4) measuring the current camera's orientation; (5) creating a 4×4 transformation matrix referenced from the initial identity matrix using recently measured orientations and translations by the camera; (6) pushing the current image and transformation matrix onto a FIFO stack; (7) rotating the camera in place without moving the camera side-to-side; and (8) repeating steps 1-7 wherein a 3D image is produced. Embodiments of the present disclosure may use sensors such as gyroscopes, magnetometers, and other rotation sensors to measure the camera's orientation.

Embodiments of the present disclosure may be executed on a mobile device 108 such as a mobile phone that is already equipped with a processing unit capable of carrying out computational operations, a digital camera, a storage medium, and a gyrometer or accelerometer. As depicted in FIG. 2, the mobile device 108 may include at least one processor/controller 204, one or more memories 208, a communication interface 212 and antenna 216, a power source 220, at least one camera 224, input 228, output 232, program storage 236, one or more sensors 240, one or more filters 244, and one or more buses 248. However, in other embodiments, the mobile device 108 includes only some of the components 204-248. For example, in one embodiment, the mobile device 108 includes the at least one processor/controller 204, the one or more memories 208, the communication interface 212 and antenna 216, the power source 220, the at least one camera 224, the input 228, the output 232, the program storage 236, the one or more sensors 240, and one or more buses 248. In general, the mobile device 108 may include any suitable combination of the components 204-248. In one application, mobile device 108, is a video telephony device (e.g., video phones, telepresence devices, a camera-equipped cellular or wireless phone, a mobile collaboration device, and a personal tablet, or laptop computer with a camera or web camera).

The processor/controller 204 may be capable of executing program instructions. The processor/controller 204 may include any general-purpose programmable processor or controller for executing application programming. Alternatively, or in addition, the processor/controller 204 may comprise an application specific integrated circuit (ASIC). The processor/controller 204 generally functions to execute programming code that implements various functions performed by the mobile device 108 in accordance with at least some embodiments of the present disclosure.

The mobile device 108 may additionally include one or more memories 208. The one or more memories 208 may be used in connection with the execution of programming instructions by the processor/controller 204, and for the temporary or long-term storage of data and/or program instructions. For example, the processor/controller 204, in conjunction with the one or more memories 208 of the mobile device 108, may operate to execute one or more instructions to capture a plurality of images of an object of interest 104, process the images, and provide three-dimensional coordinates of said object of interest 104 in accordance with embodiments of the present disclosure.

The one or more memories 208 of the mobile device 108 may comprise solid-state memory that is resident, removable and/or remote in nature, such as DRAM and SDRAM. Moreover, the one or more memories 208 may comprise a plurality of discrete components of different types and/or a plurality of logical partitions. In accordance with still other embodiments, the one or more memories 208 comprises a non-transitory computer-readable storage medium. Such a medium may take many forms, including but not limited to, non-volatile media, volatile media, and transmission media.

The mobile device 108 may include a user interface allowing a user to interact with the mobile device 108, to operate the mobile device 108, and/or to interact with a feature, function, and/or application of the mobile device 108. For example, a user of the mobile device 108 may interact with an application running on the mobile device 108 to record multiple images of the object of interest 104. Examples of input 228 may include user input devices such as but not limited to a keypad, a touch screen, a microphone, and a pointing device. Examples of output 232 may include but are not limited to user output devices such as a display 124, which may be a touch screen display, a speaker, and one or more haptic output devices.

The mobile device 108 may be equipped with a communication interface 212 and antenna 216. The communication interface 212 may comprise a GSM, CDMA, FDMA and/or analog cellular telephony transceiver capable of supporting voice, multimedia and/or data transfers over a cellular network. Alternatively, or in addition, the communication interface 212 may comprise a Wi-Fi, BLUETOOTH™, WiMax, infrared, NFC or other wireless communications link. The communication interface 212 may be associated with one or more shared or a dedicated antenna 216. The type of medium used by the mobile device 108 to communicate with other portable electronic devices may depend upon the communication application's availability on the mobile device 108 and/or the availability of the communication medium.

The mobile device 108 may include one or more sensor(s) 240, such as one or more accelerometers and/or one or more gyroscopes. An accelerometer may comprise any device that detects acceleration forces, usually in a linear direction along one or more axes. In general, an accelerometer may have the ability to gauge an orientation of the communication device relative to the Earth's surface. For example, most accelerometers include the ability to detect acceleration forces exerted with respect to one or more axes, such as the X-axis, Y-axis, and Z-axis. Thus, the accelerometer may actually comprise one or more individual accelerometers that measure the acceleration forces with respect to each axis. In general, when referring to an accelerometer or the data provided by the accelerometer, the accelerometer is assumed herein to have the capability to provide data or information regarding acceleration forces exerted on at least one of the X-axis, Y-axis, and Z-axis. Thus, the accelerometer can detect an angle at which the mobile device 108 is being held, measure movements such as rotation, motion gestures, shaking, and flicking of the mobile device 108 by sensing the acceleration forces exerted on each axis. An example of an accelerometer may include, but is not limited to, a Microelectromechanical System (MEMS) accelerometer, such as a STMicroelectronics STM331DLH.

As previously mentioned, the sensor(s) 240 may further include one or more gyroscopes. A gyroscope generally measures the rate of rotation, or the angular acceleration, around an axis. For example, a three-axis gyroscope may measure the angular acceleration around each of the X-axis, Y-axis, and Z-axis, enabling the precise calculation of yaw, pitch, and roll. An example of a gyroscope may include, but is not limited to, a Microelectromechanical System (MEMS) gyroscope, such as the STMicroelectronics L3G4200D. Although the sensor may include other instruments, such as a magnetometer, sensor(s) 240 may comprise a three-axis accelerometer and a three-axis gyroscope such that the mobile device 108 is capable of calculating how far, how fast, and in what direction the mobile device 108 has moved in a space.

Data from the one or more sensors 240 may be filtered utilizing an optional filter 244. The filter 244 may filter, or otherwise smooth, the data received from the one or more sensors 240 such that variations do in part to sensor drift, temperature, biases, and accuracy can be sufficiently accounted for. In one instance, the one or more sensors 240 may employ an Extended Kalman Filter to account for such biases and to maintain accuracy of the received measurements from a gyroscope for example.

The camera 224 may comprise any camera generally included in a mobile device 108 such as a smartphone or the like. In general, the camera resolution may be 1024×768 pixels or more and may be utilized to obtain one or more images, such as a video, of the object of interest 104.

In certain embodiments, the camera 224 is used to record video of an object. A user "sweeps" the phone back and forth across the object, allowing the camera 224 to record the object from many angles. While images are recorded, the position or inertial detection (such as a gyrometer, accelerometer, magnetometer, or other means of relative position identification) records relative or absolute positional changes. Relative changes in position are recorded for subsequent still frames in a video sequence. These changes are hereafter referred to as "θ" (Greek letter theta). Each still frame in the video sequence therefore has a θ value associated with it, indicating how far in real, physical space the recording device has moved since capturing the previous image. θ is therefore a measurement of the angle formed between two subsequent images of the same, central object.

Embodiments of the present disclosure also include identifying relative changes to virtual distances referred to as "d" 120 as shown in FIG. 1. This aspect of at least one embodiment uses a process referred to herein as pixel mapping. The distance between images acquired is indicated by identifying relative changes to virtual distances. Different elements of the image being recorded change between the two images, such as the position of the cup handle, and the corner of the table on which the cup sits, while the table in the foreground of the images changes very little. These changes will be identified in the pixel mapping process and used to estimated d 120 and assign relative, three-dimensional positions.

Figure 3B:
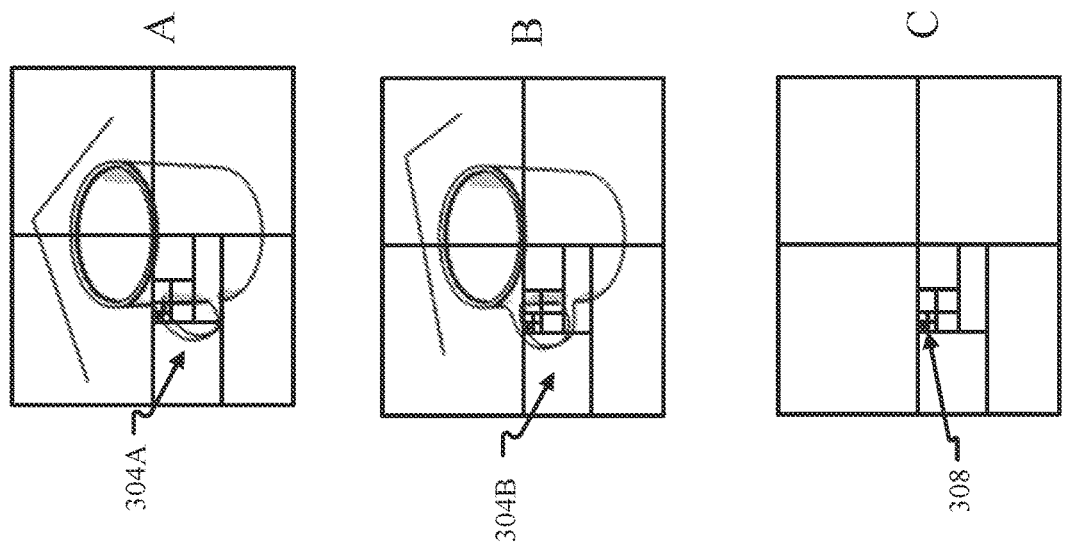

In accordance with embodiments of the present disclosure, pixel mapping compares two subsequent images and uses changes in pixel color values to estimate a distance between them. In this process, pixel values are read into an array for two subsequent images, and these values are stored in memory 208. As each image is captured in succession, it is added to a FIFO queue. The red, green, and blue values for each pixel from each of the two images are then compared by subtraction at each position. This process generates a new array, in which the matrix of difference values at each position is stored. This new array is summed, and the square root of the sum is reported as a cost function as described in FIG. 8. As illustrated in at least FIG. 3A, a first image A is obtained of an object of interest 104. Of course, the images presented in FIGS. 3A-B are for illustrative purposes and such resolution is in no way intended to limit the scope or operation of the embodiments described herein. As illustrated in FIG. 3A, the images' pixel values between image A and image B are subtracted and an array illustrated in image C is obtained. Images A, B, and C, of FIG. 3A do not show pixel values for all pixels in order to avoid unnecessarily obscuring the present disclosure. As previously discussed, the pixel values may comprise Red, Green, Blue (RGB) values. In some embodiments, a combination of RGB values may be subtracted from one another; in other embodiments, separate red images may be subtracted from one another, separate blue images may be subtracted from one another, and separate green images may be subtracted from one another. Of course other colorspaces, such as but not limited to YCbCr, YPbPr, and cmyk may be utilized.

The cost function value is used as input for a simplex optimizer, which requires a single value. The simplex optimizer may be an algorithm that minimizes the cost function, and the pixel mapping process is compatible with any available simplex optimizer. In certain embodiments, the simplex optimizer shifts one of the two images relative to the other by a number of pixels, and recomputes the cost function. Once a sufficiently low enough cost function value is achieved such that subsequent trials are unable to produce a lower value, according to a user-defined threshold, the optimizer terminates. The optimizer then reports the lowest value obtained, along with the change in X (ΔX) and change in Y (ΔY) pixel shift values used to obtain that value. This value represents the distance between the center-most pixel in each of the two images.

Once d 120 has been calculated in this way, it can be used in the following equation along with the measured θ value in accordance with Equation 1.

$$r = \left(\frac{d}{\theta}\right) \qquad \text{Equation 1}$$

As illustrated in Equation 1, the r value is used to establish a central reference point, such as (0,0, r). Once this frame of reference is established, the two images are then subdivided into quadrants as illustrated in FIG. 3B and d 120 is again calculated between each of the four quadrants as shown in FIG. 3B, again using optimization. In this embodiment, calculation of d 120 is carried out concomitantly during image acquisition; accordingly, image acquisition and feature isolation and/or movement may be determined at a same time. By successively subdividing the image into smaller regions of analysis and evaluating how far each element has moved, the valuated value therefore estimates the way in which the frame of reference is moving in physical space. This process of subdividing the images and recalculating their distances is repeated until no more similarities are found. Because some content is lost and other content is gained as the camera moves from one side to another, not all regions of the image will have distance values associated with them, because they cannot be mapped. However, as the process continues through smaller and smaller iterations, individual features of an image will be identified and their distances calculated, as shown in FIG. 3B. This entire process is repeated for each subsequent image.

In accordance with embodiments of the present disclosure, at least one embodiment makes use of an analysis of variance. By evaluating which elements have moved more quickly between frames, a simple statistical test of variance, such as least squares regression, can further inform the system of the relative distance of different objects in frame from the observer. This is based on the observation that objects near to the observer appear to move more quickly than objects far from the observer when the observer moves laterally to them. Once pixel mapping has been completed and different features of the images have been identified, a statistical test such as a regression analysis can be used to determine how those features are moving relative to one another, and therefore provide added support for the estimate of distance from the observer.

Figure 4:
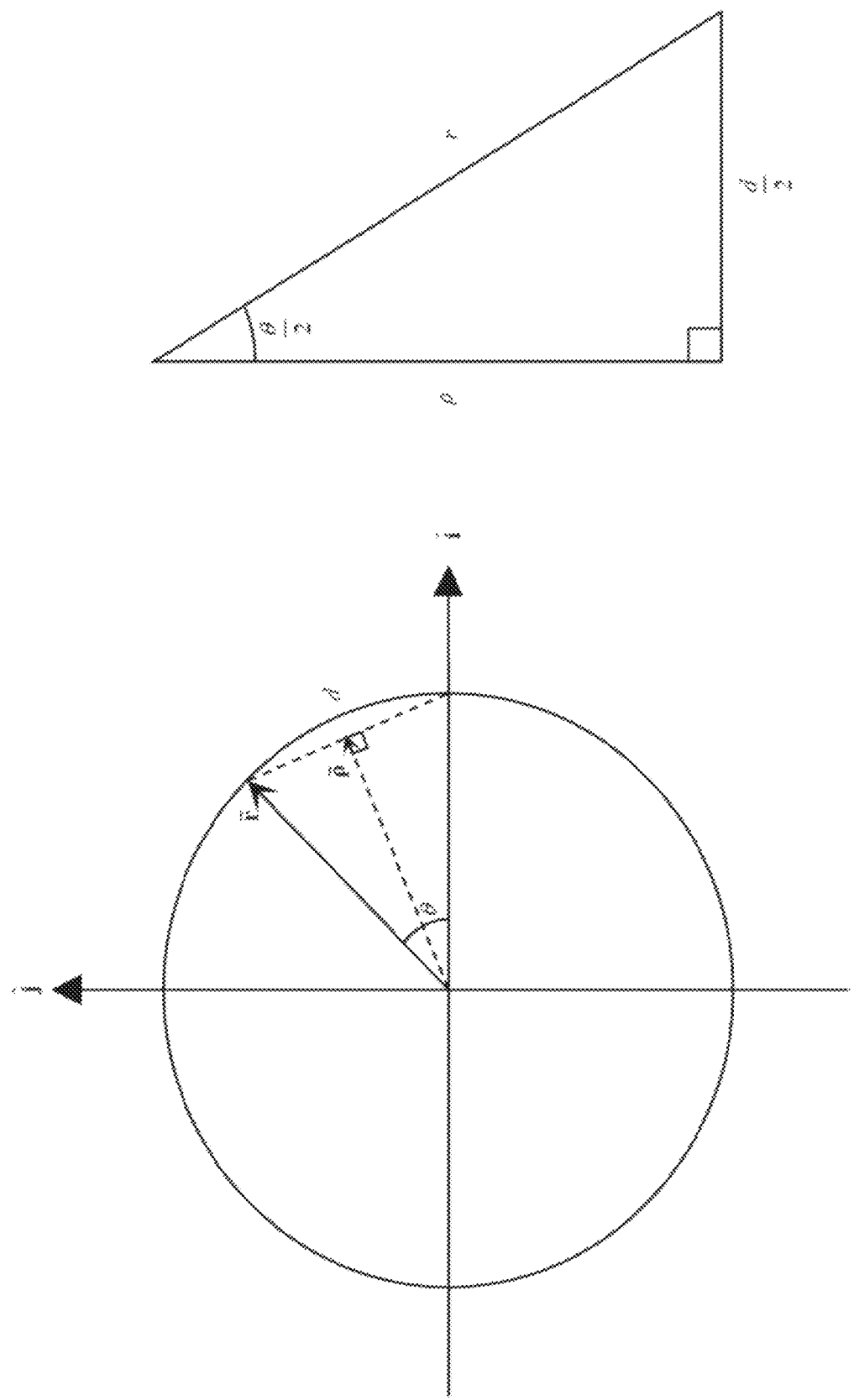
FIG. 4 is a reference frame and associated triangle utilized in accordance with embodiments of the present disclosure.

As depicted in FIG. 4, and for the purposes of this disclosure, an object being scanned may be defined as being at the origin of an arbitrary grid system. A vector describing a relative position of the camera within the mobile device with respect to the object being scanned is the physical distance between two successive images recorded by the camera and is referred to as d in FIG. 1 and FIG. 4, and the angle between these two images is θ. The coordinate system includes the object(s) of interest at its origin. As the user scans the object, the distance between any two successive images is represented by d, and the angle between said images is represented by θ. The distance from the object(s) of interest to the user is the vector, and the half angle is represented by forming a right triangle. It may be assumed that θ approaches 0 when d is very small.

The coordinates of r are therefore defined according to Equation 2.

$$\vec{r} = \begin{pmatrix} x \\ y \end{pmatrix} \quad \text{Equation 2}$$

The magnitude of r is defined according to Equation 3.

$$r = \sqrt{x^2 + y^2} \quad \text{Equation 3}$$

The half angle between two successive images forms a right angle and is defined as ρ. This secondary vector is similarly defined according to Equation 4.

$$\vec{\rho} = \begin{pmatrix} x \\ y \end{pmatrix} \quad \text{Equation 4}$$

The magnitude of ρ is defined according to Equation 5.

$$\rho = \sqrt{x^2 + y^2} \quad \text{Equation 5}$$

ρ can be determined empirically from the rearranged trigonometric identity according to Equation 6.

$$\rho = \frac{d}{2\tan\left(\frac{\theta}{2}\right)} \quad \text{Equation 6}$$

Although r≠ρ, they are similar vectors when θ is small, and approach the same value as θ approaches 0. By using live imaging, embodiments in accordance with the present disclosure make use of very small values of θ, and therefore assume r≈ρ.

To further simplify the calculations that must be performed by the processor, in accordance with at least some embodiments of the present disclosure, a Taylor Series expansion can remove all higher ordered polynomial terms ad provided in Equation 7.

$$\sin\theta = \theta - \left(\frac{\theta^3}{3!}\right) + \left(\frac{\theta^5}{5!}\right) - \ldots \quad \text{Equation 7}$$

$$\cos\theta = 1 - \theta - \left(\frac{\theta^2}{3}\right) + \left(\frac{\theta^4}{4!}\right) - \ldots$$

$$\tan(\theta) = \left(\frac{\sin\theta}{\cos\theta}\right)$$

Because of this, the following assumptions produce linear—and therefore more simplified—terms: sin θ≈θ cos θ≈1 tan θ≈θ. Using these approximations, the following assumption is produced:

$$r = \left(\frac{d}{\theta}\right) \quad \text{Equation 8}$$

In certain embodiments, d and θ are measured empirically as previously described, and r is computationally derived. A simplified calculation can be executed far more rapidly than the otherwise necessary non-linear calculations that would be required. By assuming very small lateral distances around the object, certain embodiments simplify the mathematical operations enough such that they can be performed quickly by most modern small computational units, such as smartphones. Accordingly, virtual coordinates can be generated for any real object in physical space. Certain embodiments can generate a virtual, three-dimensional model at a level of resolution limited only by the resolution of the camera and the distance of the camera to the object being scanned. These coordinates can be used to generate a virtual model in any format of the object being scanned.

In accordance with embodiments of the present disclosure, the creation of a 3D image can be performed in accordance with the following non-limiting steps:
1. Take the first picture;
1.1. Add picture to a (first in, first out) FIFO queue;
2. Take the next picture;
2.1. Add picture to a (first in, first out) FIFO queue;
3. While still taking pictures (at some defined frequency frames/second), loop back to step 2;
4. In a separate thread of execution (while pictures are being taken in steps 1-3), do the following:
    4.1. Pop the next picture off the queue (this is picture 1);
    4.1.1. Read the images pixel array and save;
    4.2. Read the next picture off the queue (this is picture 2);
    4.2.1. Read the images pixel array and save;
    4.3. Define a cost function (the function we want to minimize);
    4.3.1. Using the pixel arrays of picture 1 and 2;
    4.3.2. And given a delta-x and delta-y pixel shift amount;
    4.3.2.1. Shift picture 1 by this amount;
    4.3.3. Loop over the arrays subtracting the value of each pixel and save the differences in a new array;
    4.3.4. Compute the magnitude (normalize) the new array by treating it as a vector;
    4.3.5. Return this magnitude (imagine, the more the pictures look alike, the lower this number is);
4.4. Utilize an optimizer using the cost function in step 4.3. This can be any optimizer that will find an optimal, or at least one, solution (delta-x and delta-y) to shift picture 1 to picture 2. As one non-limiting example, a nonlinear programming simplex optimizer may be utilized;
4.5. The optimizer will continue to search for the best solution. This step is similar to the example in the last section where it is trying to move the film of picture 1 on top of picture 2 until the pictures map to each other as best as they can;
4.6. Once the optimal solution is found, the distance between the center most pixel on both pictures is known;
4.7. Compute the three-dimensional point, similar to (0, 0, r) where r is computed from Equation 8. This three-dimensional point is referenced in the user's camera frame defined in FIG. 4;
4.8. Subdivide the two pictures into quarters by dividing their arrays from steps 4.1.1 and 4.2.1;
4.9. Loop over each new sub-divided array, and pass each new pixel array to step 4.4 then execute steps 4.5 and 4.6

4.9.1. The solution of the center most pixel in the sub-divided picture is determined;

4.9.2. Using spherical coordinate transformations from Cartesian space, the new three-dimensional points may be rotated from the center of the pictures to where the pixels are located. Accordingly, there are four additional measurements.

4.10. Continue to sub-divide each picture into smaller quarters by looping over step 4.9 until the shifting of the pixels is not returning any optimal results. Steps 4.9 and 4.10 find distances between the different features of the object;

4.11. Loop back to step 4.1 until no more pictures remain on the queue from steps 1 to 3;

5. When complete, all the three-dimensional points computed are stored for further post-processing;

5.1. Using all the points measured, conduct a least-squares algorithm (LSQ) to weed out any outlying points that do not fit within a data-driven sigma value and smooth out the points (using interpolation techniques, like cubic-spine algorithm); save all the points as a three-dimensional model that can be viewed/rendered using software on a computer or printer.

By truncating the Taylor Series approximation at the second power, it is assumed to carry error on the order of three. A conservative estimate is therefore that the assumption of a small θ is reasonably safe up to approximately 10 degrees of difference between successive images. Because most modern cameras use a minimum of 24 frames per second, any sweeping motion at a reasonable pace will produce images that are well below 10 degrees of separation. Embodiments in accordance with the present disclosure are therefore not limited by these assumptions in any reasonable usage. Embodiments in accordance with the present disclosure can therefore objectively differentiate any object from any absolute angle, as long as successive images are recorded in close proximity to one another, such as through the use of video recording.

Certain embodiments use a streamlined method in a standard mobile phone equipped with a camera and gyrometer. In at least one embodiment, a user initiates the imaging software, which invokes the imaging hardware, for example, a camera. The user then aims the camera toward the object or objects of interest and initiates recording using an on-screen button.

Once in recording mode, the user then moves the phone in such away as to record the object or objects of interest from many angles. Although there is no minimum number of images acquired at different angles that are required, fidelity is improved with a greater number of angles. In this embodiment, the software is also better able to distinguish the object or objects of interest from the background through the use of a greater number of images acquired at different angles by way of an analysis of variance, as described above.

Once the user is satisfied with the length of recording in this embodiment, the user then stops the recording (while still recording the object or objects of interest), using an on-screen button. Image calculation runs concomitantly during image acquisition, and does not require separate user initiation. In certain embodiments, this process continues beyond the cessation of image acquisition, if necessary, for as long as is required to process all of the acquired images.

Once initial processing is complete, post hoc processing is automatically engaged. Alternative embodiments make this continuation step optional, allowing the user to instead carry out any post hoc analysis at a later time and on different hardware, if desired. The initial analysis produces data related to the three-dimensional location of the object or objects of interest, and can be considered independently of other analyses. Any subsequent analyses carried function to further improve fidelity of the virtual model. The modular nature of this algorithm is such that post hoc analyses are not required for the algorithm to function.

In certain embodiments, post hoc analysis is carried out and results in a table of coordinates of vector points, and includes data on their connectivity to other vector points. Data is formatted in standard 3D file formats. This data can be saved or exported to alternative file formats for importation into other software programs.

In certain embodiments, the user walks around the object(s) of interest with a mobile phone while a camera monitors the object(s) and a positional sensor within the phone tracks relative changes to position. This can be very useful in rapid prototyping and 3D printing. For example, if a user breaks the handle off of their coffee mug. The embodiment could be used to scan both the mug and the handle. The digital representations of these elements could be adjoined as one and sent as instructions to a 3D printer.

In other embodiments, movement is not restricted to a revolving motion, and may instead comprise a sweeping motion, in which a user passes the camera back and forth across one area of the object or objects. Movements involved in the recording process are unrestricted, and may comprise a user standing in one position, while moving a mobile phone back and forth in a sweeping motion. Such embodiments may involve instances in which it is not feasible or necessary to revolve an entire object. For example, if a user wishes to replace a door and wants to record the dimensions of a door-frame, the user is not required to walk around the door-frame. In this example, the user stands in one position and passes the camera back and forth across the field of view that encompasses the door frame. In instances such as these in which crisp detail is not necessary for determining dimensions, post hoc analysis may be entirely bypassed.

Other embodiments may not be implemented on a mobile device 108. For example, an airborne drone equipped with a camera and a positional tracking system (such as a GPS system, for example) might be used to investigate remote regions difficult or dangerous for human presence. In these embodiments, the drone may be equipped with on-board processing and storage media. Alternatively, the drone may not be equipped with these elements, and may instead transmit the data to an alternative location for storage and processing, or be equipped with both, and be capable of switching between formats.

Similarly, satellites investigating celestial bodies may also incorporate the disclosed method. For example, a satellite investigating a large crater on a moon might generate a three-dimensional map of the crater, revealing detail too difficult to discern in two-dimensional images. In these embodiments, additional post hoc analysis might be further incorporated. For example, one embodiment might integrate parallax or other data to generate a three-dimensional map of a distant region of the Universe instead of a near-Earth celestial body. The units in this embodiment could be in light years, and the three-dimensional map could be used to track celestial movements. In any of these embodiments, a critical advantage of this disclosure exists in that satellites need not be equipped with additional hardware. This feature of the method makes it possible for existing satellites previously launched to begin generating three-dimensional maps immediately without returning to Earth for hardware modifications. The method makes use of existing hardware, including an image acquisition feature, a celestial coordinate system, and an ability to transmit data, each already in use.

Figure 5:
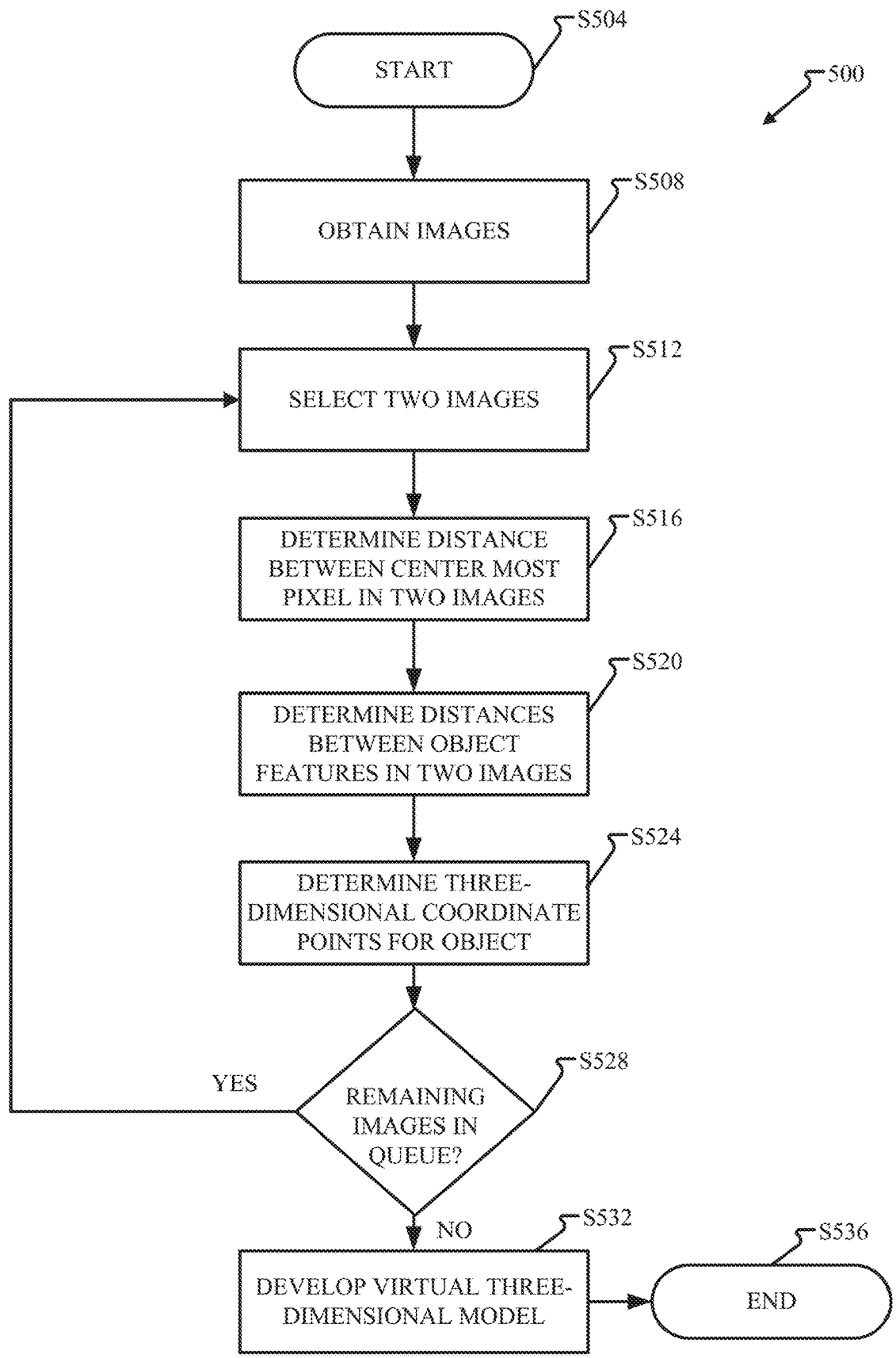
FIG. 5 depicts a flow diagram of a method generally directed to creating a three-dimensional virtual image in accordance with embodiments of the present disclosure.

Referring now to FIG. 5, a method 500 of creating a three-dimensional virtual image using a single camera, such as camera 224 of a mobile device 108 will be discussed in accordance with embodiments of the present disclosure. Method 500 is in embodiments, performed by a device, such as a mobile device 108. More specifically, one or more hardware and software components may be involved in performing method 500. The method 500 may be executed as a set of computer-executable instructions executed by a computer system and encoded or stored on a computer-readable medium. Method 500 may be executed utilizing the processor/controller 204 and/or the memory 208 of the mobile device 108. Hereinafter, the method 500 shall be explained with reference to systems, components, modules, software, etc. described with FIGS. 1-4.

Method 500 may continuously flow in a loop, flow according to a timed event, or flow according to a change in an operating or status parameter. Method 500 is initiated at step S504 where a mobile device 108 may start one or more image recordation operations in response to a user input, for example at input 228. At step S508, the mobile communication device 108 may obtain a plurality of images using the camera 224; the image may be stored in a FIFO queue for example, within the one or more memories 208 for instance. Such plurality of images is generally sequentially acquired and may include a timestamp. As one example, $T_1$ and $T_2$ of FIG. 1 may be sequentially acquired, wherein $T_2$ is acquired after $T_1$.

At step S512, two images may be selected; the two images selected may be adjacent in time; that is the second image may have been obtained right after the first image. For example, $T_2$ and $T_1$ of FIG. 1 may be selected. In some embodiments, the two selected images may not be adjacent to one another in time; instead, one or more images may exist between the two selected images. In accordance with at least some embodiments of the present invention, the two images may be selected based on a timestamp.

Flow may continue at step S516, where one or more methods, steps, and/or processes may be utilized to determine a distance between the center most pixels of the two selected images. As previously described, a difference array between the first and second image may be obtained and an optimizer utilizing one or more cost functions may find the lowest cost solution such that an X,Y shift amount is obtained. Based on the X,Y shift amount, a distance between the center most pixel of both pictures can be obtained. Accordingly, a three-dimensional point may be computed using Equation 9 for example.

Flow may continue to step S520 where features of the object of interest 104 may be obtained and distances between said features may be determined. In accordance with at least one embodiment of the present disclosure, each of the two pictures may be subdivided. As one example, each of the two pictures may be subdivided into quarters where a distance between center most pixels of the subdivided images from the first and second images may be obtained. As another example, each of the two pictures may be subdivided into halves where a distance between center most pixels of the subdivided images from the first and second images may be obtained. Similar to step S516, a difference array between the subdivided images of the first and second images may be obtained and an optimizer utilizing one or more cost functions may find the lowest cost solution such that an X,Y shift amount is obtained. Based on the X,Y shift amount, a distance between the center most pixel of both subdivided images of the first and second images can be obtained. Step S520 may loop in an iterative manner such that each smaller image is further subdivided into a predetermined number of images and distances between each of the center most pixels may be obtained. At step S524, three-dimensional coordinates for each of the obtained centermost pixels may be determined. Further, outlying points may be removed using a least-squares algorithm and points may be smoothed. At step S528, if there are additional pictures in the queue, method 500 may proceed back to step S512 where steps S512, S516, S520, and S524 are repeated. In some embodiments, an output display 124 of the mobile device 108 may display the newly determined three-dimensional points in a window on the screen as will be described later. At step S528, if no additional pictures remain in the queue, method 500 flows to step S532 where a three-dimensional model of the object of interest 104 is generated. The three-dimensional model of the object of interest 124 may be assembled utilizing the determined three-dimensional points of the various features; such points may be supplied to a shader to render the three-dimensional model. Method 500 may end at step S536.

Figure 6:
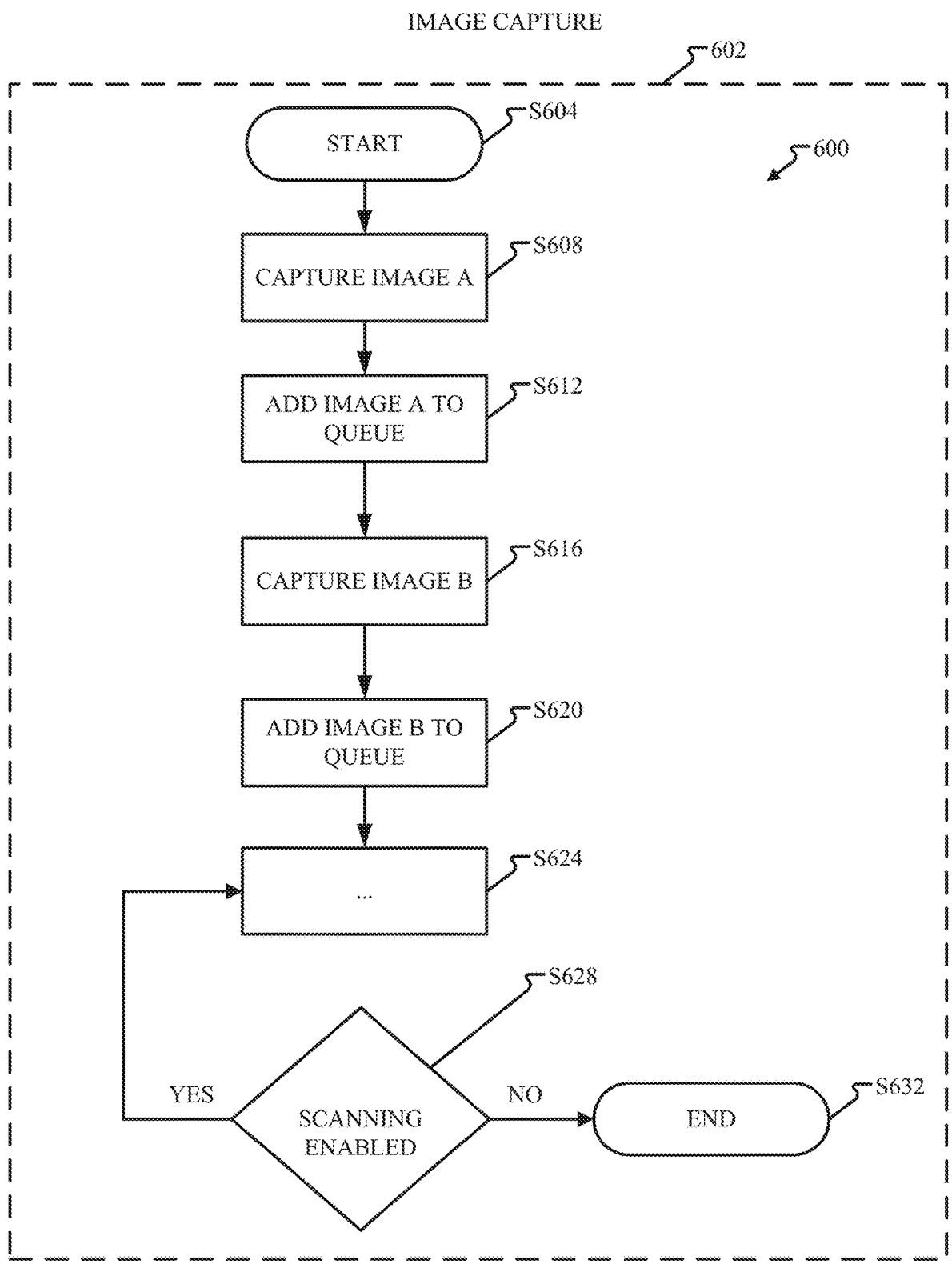
FIG. 6 depicts a flow diagram of a method generally directed to capturing images in accordance with embodiments of the present disclosure.

Referring now to FIG. 6, a method 600 for performing image capture using a single camera, such as camera 224 of a mobile device 108 will be discussed in accordance with embodiments of the present disclosure. Method 600 is in embodiments, performed by a device, such as a mobile device 108. More specifically, one or more hardware and software components may be involved in performing method 600. The method 600 may be executed as a set of computer-executable instructions executed by a computer system and encoded or stored on a computer-readable medium. Method 600 may be executed utilizing the processor/controller 204 and/or the memory 208 of the mobile device 108. Hereinafter, the method 600 shall be explained with reference to systems, components, modules, software, etc. described with FIGS. 1-5.

Method 600 may continuously flow in a loop, flow according to a timed event, or flow according to a change in an operating or status parameter. Method 600 is initiated at step S604 where a mobile device 108 may start one or more image recordation operations in response to a user input, for example at input 228. At step S608, the mobile communication device 108 may obtain a first image, such as image A. At step S612, the acquired image A may be added to a queue such as a FIFO queue. At step S616, another image, image B, may be obtained and may be added to the same FIFO queue at step S620. The FIFO queue may reside within the one or more memories 208. The process of obtaining images and adding the images to one or more queues may continue at step S624 until some threshold, such as recording time, file size, free space, and/or scanning enabled button indicates that the image acquisition process should stop. At step S632, method 600 may end. Method 600 may generally be utilized at step S508 of FIG. 5.

Figure 7:
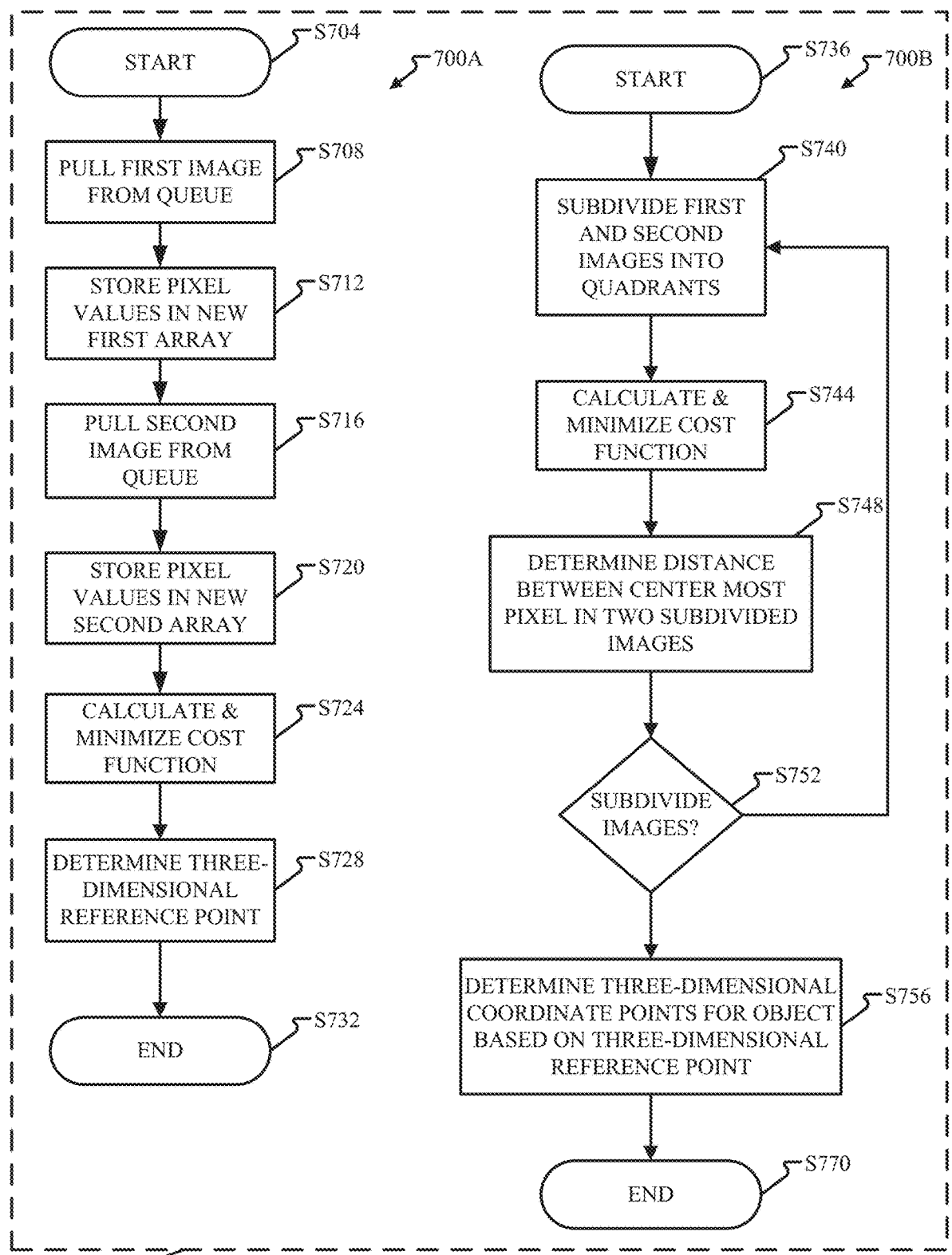
FIG. 7 depicts a flow diagram of a method generally directed to determining a three-dimensional reference point and determining three-dimensional coordinate points for an object of interest based on the three-dimensional reference point in accordance with embodiments of the present disclosure.

Referring now to FIG. 7, methods 700A and 700B for determining three-dimensional reference points using a mobile device 108 will be discussed in accordance with embodiments of the present disclosure. Methods 700A and 700B are in embodiments, performed by a device, such as a mobile device 108. More specifically, one or more hardware and software components may be involved in performing methods 700A and 700B. The methods 700A and 700B may be executed as a set of computer-executable instructions executed by a computer system and encoded or stored on a computer-readable medium. Methods 700A and 700B may be executed utilizing the processor/controller 204 and/or the memory 208 of the mobile device 108. Hereinafter, the methods 700A and 700B shall be explained with reference to systems, components, modules, software, etc. described with FIGS. 1-6.

Method 700A may continuously flow in a loop, flow according to a timed event, or flow according to a change in an operating or status parameter. Method 700A is initiated at step S704 where a mobile device 108 may initiate the determination of a three-dimensional reference point. At step S708, a first image, such as image A, may be pulled from the queue and a pixel array may be determined and stored in a new first array at step S712. At step S716, a second image, such as image B, may be pulled from the queue and a pixel array may be determined and stored in a new second array at step S720. At step S724, a difference array between the first and second image may be obtained and an optimizer utilizing one or more cost functions may find the lowest cost solution such that an X,Y shift amount is obtained. Based on the X,Y shift amount, a distance between the center most pixel of both pictures can be obtained at step S728. Accordingly, a three-dimensional reference point may be computed using Equation 9 for example. Method 700A may end at step S732.

Method 700B may continuously flow in a loop, flow according to a timed event, or flow according to a change in an operating or status parameter. Method 700B is initiated at step S736 where a mobile device 108 may initiate the determination of a three-dimensional point for features pertaining to an object of interest 104. At step S740, the first image and the second image may be subdivided. As previously discussed, the images may be subdivided into any number of smaller images 304A and 304B for example. As one example, the images may be subdivided into quadrants.

At step S744, a difference array between the subdivided images of the first and second images may be obtained (308 for example) and an optimizer utilizing one or more cost functions may find the lowest cost solution such that an X,Y shift amount is obtained. Based on the X,Y shift amount, a distance between the center most pixel of both subdivided images can be obtained at step S748. At step S752, each of the subdivided images may be further subdivided again. That is, method 700B may iterate through steps S740 to S748 further subdividing each subdivided image until a specific threshold amount is achieved. That is, method 700B may continue to subdivide images and repeat steps S740 to S748 until not additional optimized features are obtained, a predetermined number of subdivides is obtained, and/or a minimize cost determined by a simplexer is within a predetermined threshold range. Accordingly, at step S756, spherical coordinate transformations from Cartesian space may be performed and the new three-dimensional points may be rotated from the center of the pictures using the previously determined three-dimensional reference point determined at step S728. Method 700B may end at step S770 where such points are provided to step S536 of FIG. 5.

Figure 8:
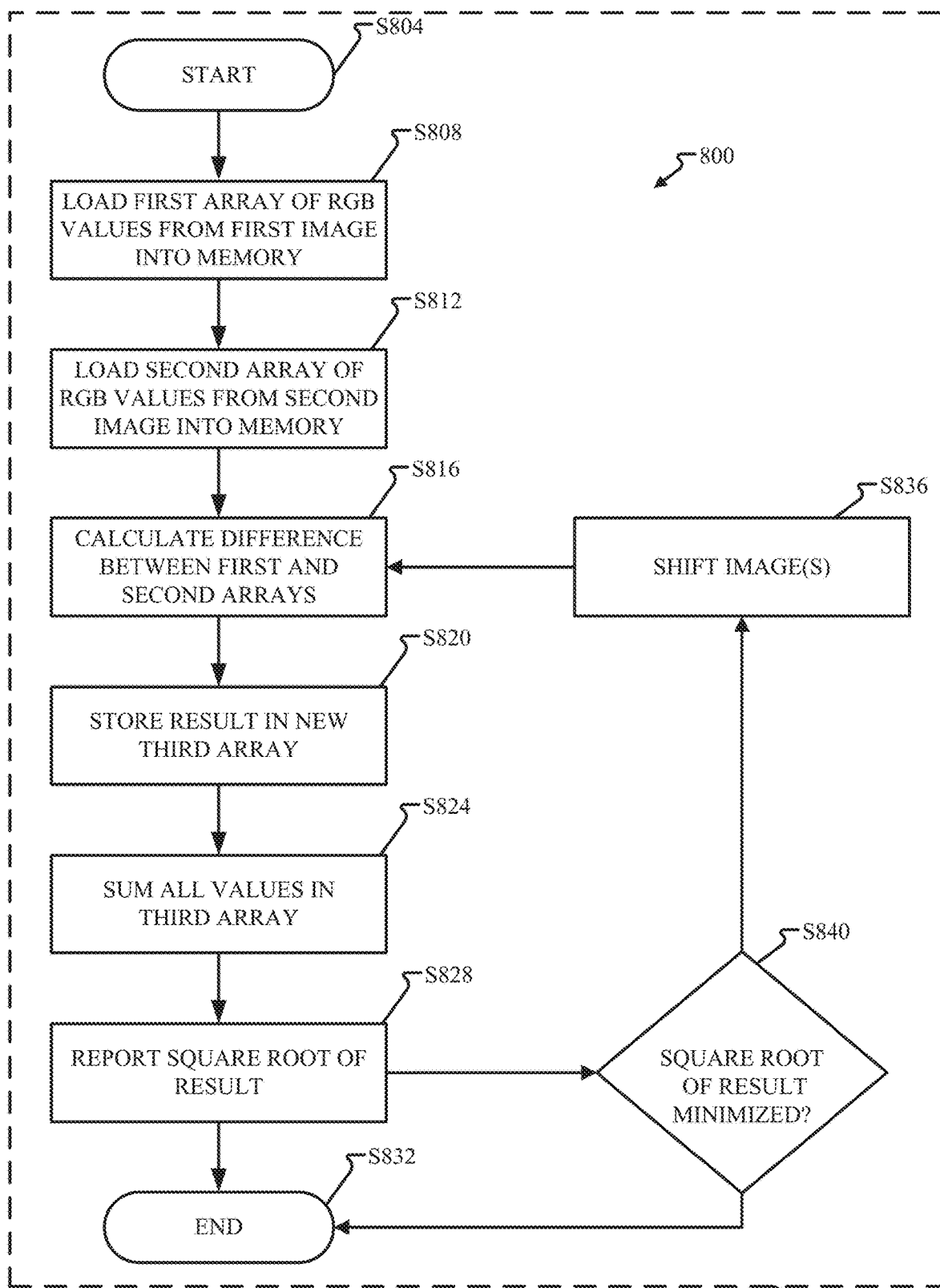
FIG. 8 depicts a flow diagram of a method generally directed to a cost function in accordance with embodiments of the present disclosure.

Referring now to FIG. 8, a method 800 implementing a cost function will be discussed in accordance with embodiments of the present disclosure. Method 800 is in embodiments, performed by a device, such as a mobile device 108. More specifically, one or more hardware and software components may be involved in performing method 800. The method 800 may be executed as a set of computer-executable instructions executed by a computer system and encoded or stored on a computer-readable medium. Method 800 may be executed utilizing the processor/controller 204 and/or the memory 208 of the mobile device 108. Hereinafter, the method 800 shall be explained with reference to systems, components, modules, software, etc. described with FIGS. 1-7.

Method 800 may continuously flow in a loop, flow according to a timed event, or flow according to a change in an operating or status parameter. Method 800 is initiated at step S804 where a mobile device 108 may perform a cost function with respect to first and second images, for example image A and image B. At step S808, a first array of pixel values, such as RGB, may be loaded from a first image (image A) into a memory location, such as within the one or more memories 208. At step S812, a second array of pixel values, such as RGB, may be loaded from a second image (image B) into a memory location, such as within the one or more memories 208. At step S816, a difference array including difference values may be generated; the difference values corresponding to a difference between pixel values in the first image and pixel values in the second image. For example, the R values of the second image may be subtracted from the first image. At step S820, the difference values may be stored in a new third array. At step S824, all values in the third array may be summed and a square root of the result may be provided at step S828. In some instances, method 800 may end at step S832. In accordance with other embodiments of the present disclosure, method 800 may continue to step S840 where an optimizer may determine whether or not the square root of the result has been minimized. In some instances, the images may be shifted by one or more pixels in a first and/or second direction at step S836 and steps S816 to S828 may be performed again. In some instances, a simplexer as previously described may minimize the cost function. Once the cost function has been sufficiently minimized, such as within a predetermined range of a threshold, method 800 may end at step S832.

Figure 9:
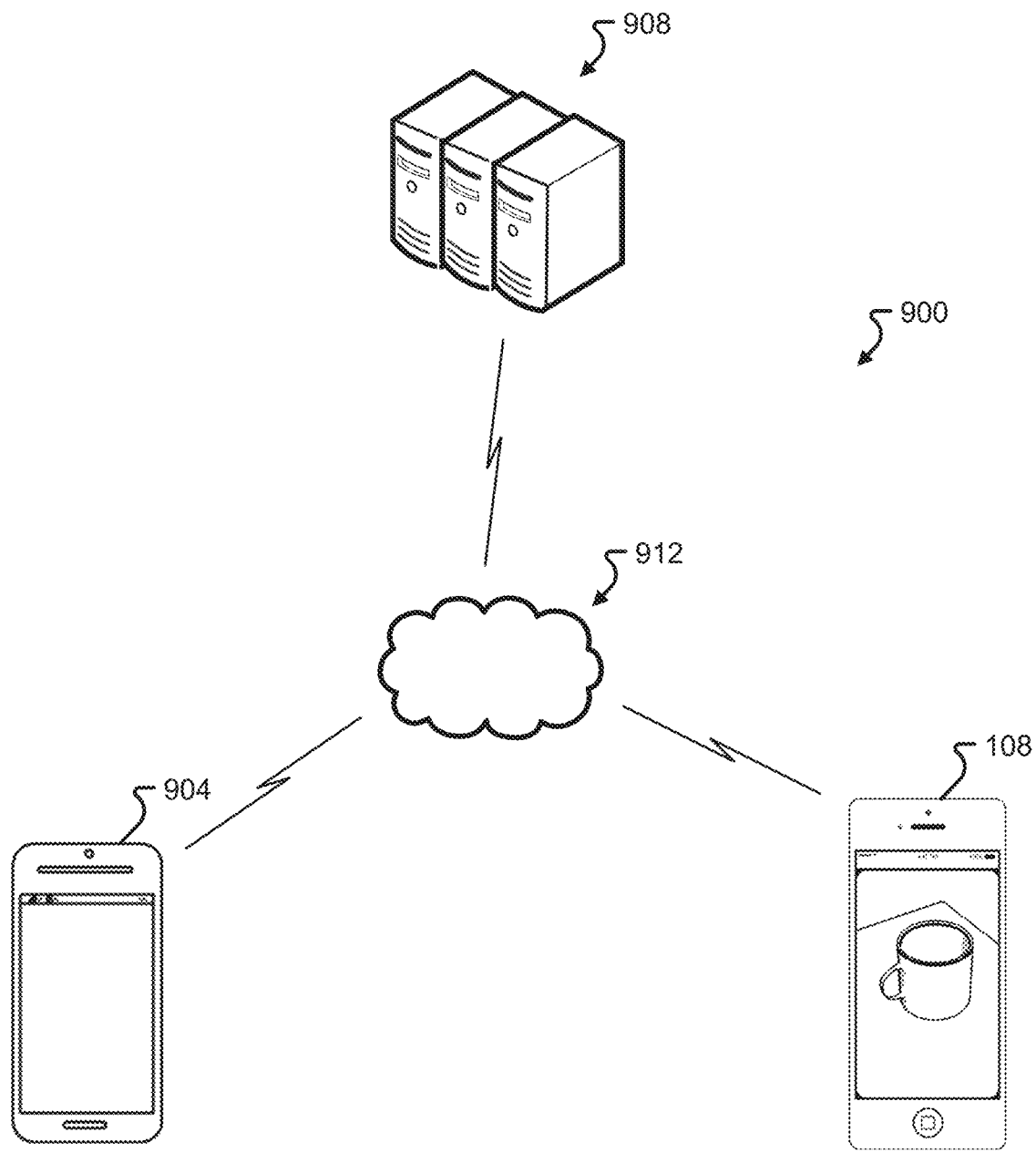
FIG. 9 depicts a second system for creating a three-dimensional virtual image in accordance with at least some embodiments of the present disclosure.

FIG. 9 generally depicts a second system for creating a three-dimensional virtual image in accordance with at least some embodiments of the present disclosure. In accordance with at least some embodiments of the present disclosure, part of the method for creating a three-dimensional virtual image may be performed on a device other than mobile device 108. That is, the method may be distributed across at network 912, where a first set of servers 908 may perform part of the method and/or another device, such as mobile device 904 may perform another part of the method. For example, mobile device 108 may obtain a plurality of images; mobile device 108 may transfer some or all of the plurality of images across the network 912 to one or more server devices 908. The server device 908 may utilize the plurality of images to create a three-dimensional model in accordance with one or more previously described methods. The three-dimensional model may then be sent back to the mobile device 108. Alternatively, or in addition, another device, such as device 904 may perform part of the three-dimensional model development. For instance, a plurality of images may be sent to the server devices 908 and a plurality of the images may be sent to the other device 904. Both server devices 908 and mobile device 904 may determine three-dimensional coordinate points and such points may be combined and provided to mobile device 108. Mobile device 108, or another device communicatively coupled to mobile device 108, may create the three-dimensional model of the object of interest 104 using one or more shaders.

The server device 908 and/or the other device 904 may generally include the same elements as those found and described within the mobile device 108 in FIG. 2. Moreover, the network 912 may include one or more networks capable of supporting communications between nodes of the system 900. Examples of communication networks 912 include the Internet or any wide area network (WAN), local area network (LAN), or networks in various combinations. Other examples of communication networks 912 in accordance with embodiments of the present disclosure include wireless networks, cable networks, satellite networks, and digital subscriber line (DSL) networks. In addition, different communication networks 912 may share a common physical infrastructure, for at least some portion of the physical network. For instance, a mobile device 108 may be interconnected to a communication network 912 comprising the Internet and to a separate communication network between the device 904 and mobile device 108.

Figure 10:
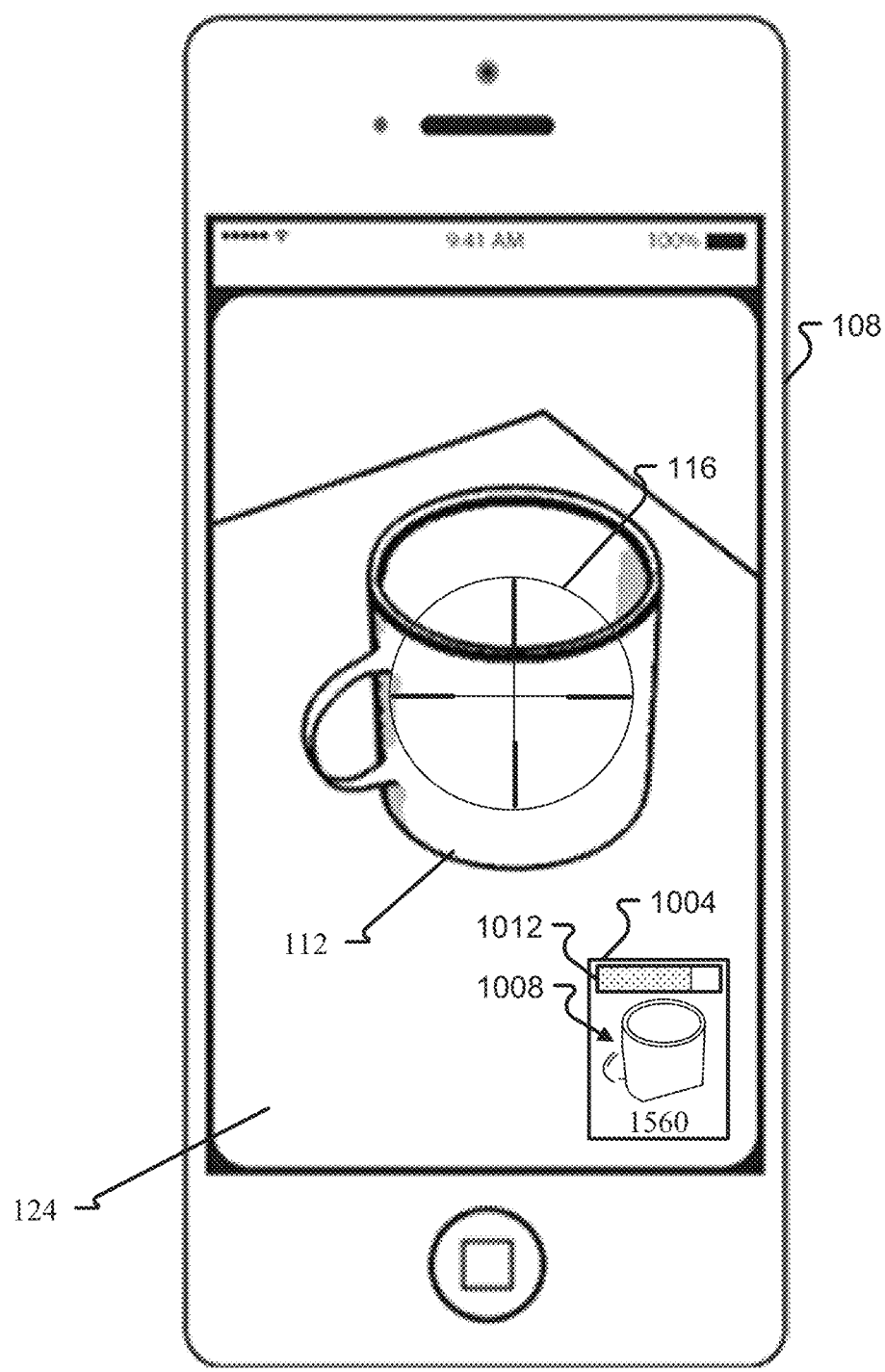
FIG. 10 depicts a display of a communication device in accordance with at least some embodiments of the present disclosure.

FIG. 10 generally depicts a display 124 of a mobile device 108 in accordance with at least some embodiments of the present disclosure. As previously described, the mobile device 108 may display an image 112 of the object of interest 104 on the display 124. The display 124 may also include an information box 1004 including a status bar 1012 and a partial and/or complete rendering of the three-dimensional model 1008 of the object of interest 104. The status bar 1012 generally provides an indication as to a number of acquired three-dimensional points verses an estimated number of three-dimensional points needed for a complete model. Alternatively, or in addition, and as further depicted in FIG. 10, a number of acquired three-dimensional points may be displayed. For instance, the information box 1004 indicates that 1560 three-dimensionally acquired.

The information box 1004 further includes a partial and/or complete rendering of the three-dimensional model 1008 of the object of interest 104. As previously discussed, the complete rendering of the three-dimensional model 1008 of the object of interest 104 may be generally displayed over time as three-dimensional points of a three-dimensional model are acquired and determined. Accordingly, as depicted in FIG. 10, because not all three-dimensional points of the object of interest 104 have been determined, the rendering of the object of interest 1008 within the information box 1004 is incomplete. Such incomplete drawing further corresponds to the status bar 1012 indicating that additional three-dimensional points are needed. FIG. 10 additionally depicts abounding box 116.

As previously described, a least-squares algorithm (LSQ) may be utilized to weed out any outlying points that do not fit within a specific location. The bounding box 116 may define the specific location of which outlying points not within the bounding box 116 may be removed. Accordingly, the need to perform a least-squares algorithm may be dramatically reduced.

In accordance with embodiments of the present disclosure, it may be unnecessary to subdivide the image to acquire three-dimensional points of features belonging to the object of interest 104. Instead, three-dimensional points, and thus coordinates, may be acquired utilizing only the center of the bounding box 116. That is, as a user is obtaining images of the object of interest 104, method 700A may be continuously implemented such that the center of the first and second images corresponds directly to the center of the bounding box 116. Accordingly, over time, only those three-dimensional points corresponding to the center of the bounding box 116 may be determined as the user sweeps the mobile device 108 back and forth to image the object of interest.

Figure 11:
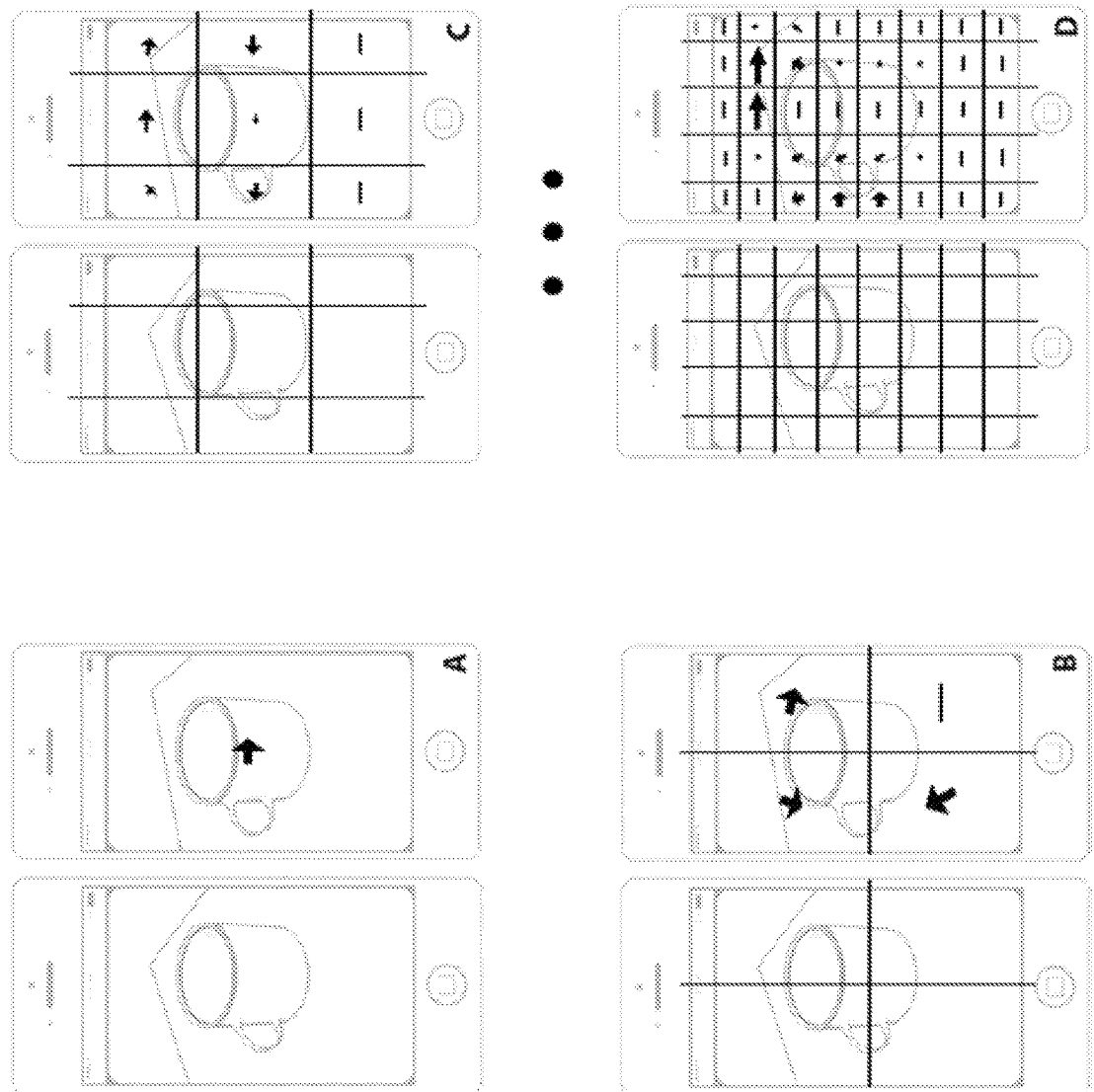
FIG. 11 generally depicts a visual representation of an iterative estimation of distance based on a rate of movement of an object in accordance with at least some embodiments of the present disclosure.

FIG. 11 depicts an additional method of obtaining three-dimensional points in accordance with at least one embodiment of the present disclosure. That is, instead of continually subdividing images to account for features of an object of interest 104, the rate of movement of features within an image of an object of interest 104 may determine what portions of the image are subdivided and/or further how many times such image is subdivided. Alternatively, or in addition, the rate of movement of features within an image of an object of interest 104 may determine optimization thresholds for a particular area of the image. Accordingly, if there is great change between one portion of an image and another portion of a previous image, a threshold utilized via the cost function and/or simplexer may be lower or tighter than a portion of an image that has less movement. As depicted in image A of FIG. 11, if a general movement of the entire image is to be considered, the ability to fine tune movement based thresholds does not exist when compared to images B, C, and D of FIG. 11. That is, the more that movement can be localized to a portion of an image, the more accurate results based on motion will be.

Alternatively, or in addition, rather than continually subdividing the image, the image may already be subdivided as depicted in FIG. 11. Accordingly, each region localized and impacted by motion, may be matched independently to a previous image or frame, improving an accuracy of a resulting three-dimensional point. As previously discussed, the more that movement can be localized to a portion of an image, the more accurate results based on motion will be and thus, the more accurate three-dimensional points will be.

The exemplary systems and methods of this disclosure have been described in relation to a system and method for generating a virtual three-dimensional model using a single camera. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific details set forth herein.

The embodiments presented herein provide advantages. For example, a single camera utilized in conjunction with a mobile device may be used to generate a virtual three-dimensional model of an object of interest.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a mobile device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

It is therefore apparent that there has been provided, in accordance with embodiments of the present invention, systems, apparatuses, and methods for enhancing call preservation techniques. While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of this invention.

What is claimed is:

1. A method of generating a model of an object comprising:

obtaining, sequentially, a plurality of two-dimensional images of the object with a movable camera, the plurality of two-dimensional images being captured from different orientations of the camera relative to the object;

recording, while obtaining the plurality of two-dimensional images of the object, positional changes of the camera for each of the plurality of two-dimensional images being captured from different orientations, the positional changes including: an angle between each of the plurality of two-dimensional images and a distance the camera moves between each of the plurality of two-dimensional images;

storing the plurality of two-dimensional images and the positional changes into memory;

determining a relative change in position of the object within the plurality of two-dimensional images by comparing two images of the plurality of two-dimensional images, wherein the relative change is determined by evaluating a difference in color intensity values between pixels of one of the two-dimensional images and another of the two-dimensional images, the comparison including performing repeated shifting of one of the two-dimensional images relative to another, the relative change used to determine a distance from the camera to the object;

generating a three-dimensional coordinate based on the relative change in position; and outputting a computer image including the three-dimensional coordinate, wherein the computer image represents the object.

2. The method according to claim 1, wherein the plurality of two-dimensional images of the object are obtained using a single camera.

3. The method according to claim 2, further comprising:
receiving orientation information for each two-dimensional image of the plurality of two-dimensional images; and
generating the three-dimensional coordinate based on the relative change in position and the received orientation information.

4. The method according to claim 3, wherein the orientation information is received from a gyroscope.

5. The method according to claim 4, further comprising:
subdividing the two-dimensional images of the plurality of two-dimensional images into a plurality of sub-images; and
for each sub-image of the plurality of sub-images:
determining a relative change in position of a first sub-image from a first of the two-dimensional images with respect to a first sub-image from a second of the two-dimensional images,
wherein the relative change is determined by the difference in color intensity values between pixels of the first sub-image from the first of the two-dimensional images and the pixels of the first sub-image from the second of the two-dimensional images, and
generating the three-dimensional coordinate based on the relative change in position of the first sub-image from the first two-dimensional image and the first sub-image from the second two-dimensional image.

6. The method according to claim 5, wherein each of the two-dimensional images are subdivided into four sub-images.

7. The method according to claim 4, further comprising:
determining a similarity between the one of the two-dimensional images and the other the two-dimensional image; and
maximizing the similarity between the one of the two-dimensional images and the other two-dimensional images by shifting in at least one of a horizontal or vertical direction, the one of the two-dimensional images with respect to the other image, wherein relative change is determined by creating a difference array, the difference array including differences in color intensity values between pixels of the one of the two-dimensional images and the other image, wherein the one of the two-dimensional images is shifted in at least one of a horizontal or vertical direction with respect to the other image.

8. A device comprising:
a display;
a camera;
a processor configured to communicate with the display and camera; and
storage configured to store instructions that when executed by the processor, cause the processor to:
obtain, sequentially, a plurality of two-dimensional images of the object with a movable camera, the plurality of two-dimensional images being captured from different orientations of the camera relative to the object;
record, while obtaining the plurality of two-dimensional images of the object, positional changes of the camera for each of the plurality of two-dimensional images being captured from different orientations, the positional changes including: an angle between each of the plurality of two-dimensional images and a distance the camera moves between each of the plurality of two-dimensional images;
store the plurality of two-dimensional images and the positional changes in the storage;
determine a relative change in position of the object within the plurality of two-dimensional images by comparing two images of the plurality of two-dimensional images, wherein the relative change is determined by evaluating a difference in color intensity values between pixels of one of the two-dimensional images and another of the two-dimensional images, the comparison including performing repeated shifting of one of the two-dimensional images relative to another, the relative change used to determine a distance from the camera to the object;
generate a three-dimensional coordinate based on the relative change in position; and
output a computer image including the three-dimensional coordinate, wherein the computer image represents a virtual three-dimensional model of the object.

9. The device according to claim 8, wherein the plurality of two-dimensional images of the object are obtained using a single camera of the mobile device.

10. The device according to claim 9, wherein the one or more memories include one or more instructions that when executed by the processor, cause the processor to:
receive orientation information for each two-dimensional image of the plurality of two-dimensional images; and
generate the three-dimensional coordinate based on the relative change in position and the received orientation information.

11. The device according to claim 10, wherein the orientation information is received from a gyroscope.

12. The mobile device according to claim 11, wherein the one or more memories include one or more instructions that when executed by the processor, cause the processor to:
subdivide the two-dimensional images of the plurality of two-dimensional images into a plurality of sub-images; and
for each sub-image of the plurality of sub-images, determine a relative change in position of a first sub-image from a first of the two-dimensional images with respect to a first sub-image from a second of the two-dimensional images, wherein the relative change is determined by the difference in color intensity values between pixels of the first sub-image from the first two-dimensional image and the pixels of the first sub-image from the second of the two-dimensional images, and generate the three-dimensional coordinate based on the relative change in position of the first sub-image from the first two-dimensional image and the first sub-image from the second two-dimensional image.

13. The mobile device according to claim 12, wherein each of the two-dimensional images of the plurality of two-dimensional images are each subdivided into four sub-images.

14. The mobile device according to claim 11, wherein the one or more memories include one or more instructions that when executed by the processor, cause the processor to:
determine a similarity between the one of the two-dimensional images and the other two-dimensional image; and
maximize the similarity between the one of the two-dimensional images and the other two-dimensional image by shifting in at least one of a horizontal or vertical direction, the one of the two-dimensional images with respect to the other two-dimensional image, wherein the relative change is determined by creating a difference array, the difference array including differences in color intensity values between pixels of the one two-dimensional image and the other two-dimensional image, wherein the one of the two-dimensional images is shifted in at least one of a horizontal or vertical direction with respect to the other two-dimensional images.

15. A non-transitory computer-readable information storage media having stored thereon instructions that cause a processor to execute a method, the instructions comprising:
  instructions to obtain, sequentially, a plurality of two-dimensional images of the object with a movable camera, the plurality of two-dimensional images being captured from different orientations of the camera relative to the object;
  instructions to record, while obtaining the plurality of two-dimensional images of the object, positional changes of the camera for each of the plurality of two-dimensional images being captured from different orientations, the positional changes including: an angle between each of the plurality of two-dimensional images and a distance the camera moves between each of the plurality of two-dimensional images;
  instructions to store the plurality of two-dimensional images and the positional changes in the storage;
  instructions to determine a relative change in position of the object within the plurality of two-dimensional images by comparing two images of the plurality of two-dimensional images, wherein the relative change is determined by evaluating a difference in color intensity values between pixels of one of the two-dimensional images and another of the two-dimensional images, the comparison including performing repeated shifting of one of the two-dimensional images relative to another, the relative change used to determine a distance from the camera to the object;
  instructions to generate a three-dimensional coordinate based on the relative change in position; and
  instructions to output a computer image including the three-dimensional coordinate, wherein the computer image represents a virtual three-dimensional model of the object.

16. The non-transitory computer-readable information storage media of claim 15, wherein the plurality of two-dimensional images of the are obtained using a single camera of a device.

17. The non-transitory computer-readable information storage media of claim 16, further comprising:
  instructions to receive orientation information for each two-dimensional image of the plurality of two-dimensional images; and
  instructions to generate the three-dimensional coordinate based on the relative change in position and the received orientation information.

18. The non-transitory computer-readable information storage media of claim 17, wherein the orientation information is received from a gyroscope of a mobile device.

19. The non-transitory computer-readable information storage media of claim 17, further comprising:
  instructions to subdivide the two-dimensional images of the plurality of two-dimensional images into a plurality of sub-images; and
  instructions to determine a relative change in position of a first sub-image from a first of the two-dimensional images with respect to a first sub-image from a second of the two-dimensional images, wherein the relative change is determined by the difference in color intensity values between pixels of the first sub-image from the first of the two-dimensional images and the pixels of the first sub-image from the second of the two-dimensional images, and generate the three-dimensional coordinate based on the relative change in position of the first sub-image from the first of the two-dimensional images and the first sub-image from the second of the two-dimensional images.

20. The non-transitory computer-readable information storage media of claim 19, wherein the two-dimensional images of the plurality of two-dimensional images are each subdivided into four sub-images.

* * * * *